(12) United States Patent
Gunderman et al.

(10) Patent No.: US 7,400,490 B2
(45) Date of Patent: Jul. 15, 2008

(54) ULTRACAPACITORS COMPRISED OF MINERAL MICROTUBULES

(75) Inventors: Robert D. Gunderman, Honeoye Falls, NY (US); John M Hammond, Livonia, NY (US)

(73) Assignee: NaturalNano Research, Inc., Pittsford, NY (US)

( * ) Notice: Subject to any disclaimer, the term of this patent is extended or adjusted under 35 U.S.C. 154(b) by 255 days.

(21) Appl. No.: 11/134,657

(22) Filed: May 20, 2005

(65) Prior Publication Data

US 2006/0166810 A1 Jul. 27, 2006

Related U.S. Application Data

(63) Continuation-in-part of application No. 11/042,219, filed on Jan. 25, 2005.

(51) Int. Cl.
*H01G 9/00* (2006.01)

(52) U.S. Cl. ............... 361/502; 361/503; 361/504; 361/508; 361/311; 361/313

(58) Field of Classification Search ........... 361/502, 361/503, 504, 508–512, 516–519, 302–305, 361/311–313
See application file for complete search history.

(56) References Cited

U.S. PATENT DOCUMENTS

| | | | |
|---|---|---|---|
| 3,581,159 A | 5/1971 | Piper |
| 3,648,126 A | 3/1972 | Boos |
| 3,915,731 A | 10/1975 | Sugahara |
| 4,019,934 A | 4/1977 | Takayama |
| 4,098,676 A | 7/1978 | Robson |
| 4,150,099 A | 4/1979 | Robson |
| 4,364,857 A | 12/1982 | Santilli |
| 4,383,606 A | 5/1983 | Hunter |
| 4,485,387 A | 11/1984 | Drumheller |
| 4,547,286 A | 10/1985 | Hsiung |
| 4,739,007 A | 4/1988 | Okada |
| 4,741,841 A | 5/1988 | Borre |
| 4,790,942 A | 12/1988 | Shmidt |
| 4,810,734 A | 3/1989 | Kawasumi |
| 4,838,606 A | 6/1989 | Furubayashi |
| 4,867,917 A | 9/1989 | Schnur |
| 4,877,501 A | 10/1989 | Schnur |
| 4,894,411 A | 1/1990 | Okada |
| 4,911,981 A | 3/1990 | Schnur |
| 4,944,883 A | 7/1990 | Schoendorfer |
| 4,960,450 A | 10/1990 | Schwarz |

(Continued)

OTHER PUBLICATIONS

Kay Hyeok An et al., "Characterization of Supercapacitors Using Singlewalled Carbon Nanotube Electrodes", *Journal of the Korean Physical Society*, vol. 39 (Dec. 2001) pp. S511-S517.

D.A. Robinson et al., "A Method for Measuring the Solid Particle Permittivity or Electrical Conductivity of Rocks, Sediments, and Granular Materials," *Journal of Geophysical Research*, vol. 108, No. B2 (2003), ECV 5-1-9.

(Continued)

*Primary Examiner*—Nguyen T Ha

(57) ABSTRACT

Disclosed is an ultracapacitor having electrodes containing mineral microtubules, an electrolyte between the electrodes, and a separator in the electrolyte to provide electrical insulation between the electrodes, while allowing ion flow within the electrolyte. The electrodes may be formed from a paste containing microtubules, a conductive polymer containing mineral microtubules, or an aerogel containing the mineral microtubules. The mineral microtubules may be filed with carbon, a pseudocapacitance material, or a magnetoresistive material. The mineral microtubules may also be coated with a photoconductive material.

10 Claims, 16 Drawing Sheets

U.S. PATENT DOCUMENTS

| | | | |
|---|---|---|---|
| 4,990,291 A | 2/1991 | Schoen |
| 5,049,382 A | 9/1991 | Price |
| 5,053,127 A | 10/1991 | Schoendorfer |
| 5,096,551 A | 3/1992 | Schoen, Jr. |
| 5,102,948 A | 4/1992 | Deguchi |
| 5,164,440 A | 11/1992 | Deguchi |
| 5,171,206 A | 12/1992 | Marque |
| 5,246,689 A | 9/1993 | Beck |
| 5,248,720 A | 9/1993 | Deguchi |
| 5,492,696 A | 2/1996 | Price |
| 5,641,622 A | 6/1997 | Lake |
| 5,651,976 A | 7/1997 | Price |
| 5,653,951 A | 8/1997 | Rodriguez |
| 5,654,117 A | 8/1997 | Nealey |
| 5,674,173 A | 10/1997 | Hlavinka |
| 5,681,464 A | 10/1997 | Larsson |
| 5,705,191 A | 1/1998 | Price |
| 5,722,923 A | 3/1998 | Lui |
| 5,783,085 A | 7/1998 | Fischel |
| 5,827,186 A | 10/1998 | Chen |
| 5,854,326 A | 12/1998 | Sakaya |
| 5,906,570 A | 5/1999 | Langley |
| 5,906,792 A | 5/1999 | Schulz |
| 5,913,768 A | 6/1999 | Langley |
| 5,939,319 A | 8/1999 | Hlavinka |
| 5,951,877 A | 9/1999 | Langley |
| 5,972,448 A | 10/1999 | Frisk |
| 5,993,996 A * | 11/1999 | Firsich .................... 429/231.8 |
| 6,013,206 A | 1/2000 | Price |
| 6,034,163 A | 3/2000 | Barbee |
| 6,051,146 A | 4/2000 | Green |
| 6,060,549 A | 5/2000 | Li |
| 6,067,480 A | 5/2000 | Stuffle |
| 6,071,422 A | 6/2000 | Hlavinka |
| 6,074,453 A | 6/2000 | Anderson |
| 6,117,541 A | 9/2000 | Frisk |
| 6,143,052 A | 11/2000 | Kiyokawa |
| 6,159,538 A | 12/2000 | Rodriguez |
| 6,190,775 B1 | 2/2001 | Smith |
| 6,195,443 B1 | 2/2001 | Hammond |
| 6,207,793 B1 | 3/2001 | Kim |
| 6,231,980 B1 | 5/2001 | Cohen |
| 6,265,038 B1 | 7/2001 | Frisk |
| 6,280,759 B1 | 8/2001 | Price |
| 6,290,753 B1 | 9/2001 | Maeland |
| 6,294,142 B1 | 9/2001 | Nazri |
| 6,331,253 B1 | 12/2001 | Schrive |
| 6,354,986 B1 | 3/2002 | Hlavinka |
| 6,356,433 B1 | 3/2002 | Shi et al. |
| 6,401,816 B1 | 6/2002 | Price |
| 6,461,513 B1 | 10/2002 | Jen |
| 6,475,071 B1 | 11/2002 | Joslyn |
| 6,491,789 B2 * | 12/2002 | Niu .......................... 162/145 |
| 6,517,800 B1 | 2/2003 | Cheng |
| 6,578,596 B1 | 6/2003 | Batchelder |
| 6,589,312 B1 | 7/2003 | Snow |
| 6,591,617 B2 | 7/2003 | Wolfe |
| 6,596,055 B2 | 7/2003 | Cooper |
| 6,665,169 B2 | 12/2003 | Tennent et al. |
| 6,667,354 B1 | 12/2003 | Fox |
| 6,672,077 B1 | 1/2004 | Bradley |
| 6,704,192 B2 * | 3/2004 | Pekala ........................ 361/502 |
| 6,710,111 B2 | 3/2004 | Kuo |
| 6,728,456 B1 | 4/2004 | Aylward |
| 6,749,414 B1 | 6/2004 | Hanson |
| 6,767,952 B2 | 7/2004 | Dontula |
| 6,770,697 B2 | 8/2004 | Drewniak |
| 6,790,403 B1 | 9/2004 | Priedeman, Jr. |
| 6,797,342 B1 | 9/2004 | Sanchez |
| 6,811,599 B2 | 11/2004 | Fischer |
| 6,832,037 B2 | 12/2004 | Aylward |
| 7,248,460 B2 * | 7/2007 | Omura et al. ............... 361/502 |
| 2002/0110686 A1 | 8/2002 | Dugan |
| 2002/0132875 A1 | 9/2002 | Stadtmueller |
| 2002/0150529 A1 | 10/2002 | Dillon et al. |
| 2002/0161101 A1 | 10/2002 | Carroll et al. |
| 2002/0187896 A1 | 12/2002 | Ryoo et al. |
| 2003/0191224 A1 | 10/2003 | Maruyama et al. |
| 2003/0203989 A1 | 10/2003 | Rao et al. |
| 2004/0011668 A1 | 1/2004 | Shiepe et al. |
| 2004/0034122 A1 | 2/2004 | Lacy |
| 2004/0059303 A1 | 3/2004 | Anderson et al. |
| 2004/0067033 A1 | 4/2004 | Aylward et al. |
| 2004/0068038 A1 | 4/2004 | Robello et al. |
| 2004/0101466 A1 | 5/2004 | Dillon et al. |
| 2004/0173531 A1 | 9/2004 | Hammond |
| 2004/0222561 A1 | 11/2004 | Hopkins |
| 2004/0233526 A1 | 11/2004 | Kaminsky et al. |
| 2004/0242752 A1 | 12/2004 | Fujioka et al. |
| 2004/0259999 A1 | 12/2004 | Kim et al. |

OTHER PUBLICATIONS

Andrew Burke, "Ultracapacitors: Why, How, and Where is the Technology" *Journal of Power Sources* 91 (2000) 37-50, Elsevier Science.

Kay Hyeok An et al., "High-Capacitance Supercapacitor Using a Nanocomposite Electrode of Single-Walled Carbon Nanotube and Polypyrrole" *Journal of the Electrochemical Society*, 149(8) A1058-A-1062 (2002).

Brian E. Conway, "Electrochemical Capacitors: Their Nature, Function, and Applications" *Electrochemistry Encyclopedia* (Mar. 2003).

Adam Marcus Namisnyk, "A Survey of Electromechanical Supercapacitor Technology" Thesis (Jun. 2003).

Lvov, Yuri M.; Nanofabrication of Ordered Multilayers by Alternate Absorption of Polyions, Nanoparticles and Proteins: From Planar Films to Microtemplates; Institute for Micromanufacturing, Latech, Ruston, LA 71272; latech.edu, Mar. 27, 2005, http://www2.latech.edu/-ylvov/research. html.

Lueking, Angela et al.; Hydrogen Storage in Carbon Nanotubes: Residual Metal Content and Pretreatment Temperature; American Institute of Chemical Engineers, AIChE Journal Jul. 15, 2003; http://www.fuelcelltoday.com,Jul. 9, 2004, Originally published Jun. 1, 2003.

Atlas Mining Company Enters into Collaborative Agreement with NaturalNano Inc., from Industrialnewsupdate.com, Mar. 30, 2005, http://www.industrialnewsupdate.com/news/metals-mining/archives/2005/01.

White, S. et al.; Fabricated Microvascular Networks; AFRL Technology Horizons, Apr. 2004. pp. 34-35 from http://www.afrlhorizons.com/Briefs/Apr04/OSR0305.html.

Price, R.; Microtubular Encapsulation Technology Developed by the Naval Research Laboratory; exact publication date unknown, but prior to Dec. 2004.

Swanson, D. ; Halloysite Microtubules for Controlled Release; on-line presentation file of Montana State University, available at http://www.atlasmining.com/Microtubule-Research.ppt. Exact publication date unknown but prior to Dec. 2004.

Levis, S.R., et al.; Characterization of halloysite for use as a microtubular drug delivery system; International Journal of Pharmaceuticals 243 (2002) 125-134.

Levis, S.R. et al; Use of coated microtubular halloysite for the sustained release of diltiazem hydrochloride and propranolol hydrochloride; International Journal of Pharmaceuticals 253(2003) 145-157.

Ohmcraft product application literature, "Thick Film on Steel fact sheet," Aug. 13, 2004. obtained from http://www.ohmcraft.com/PDFs/LiteratureDocuments/ThickFilmSteelFactSheet.pdf.

* cited by examiner

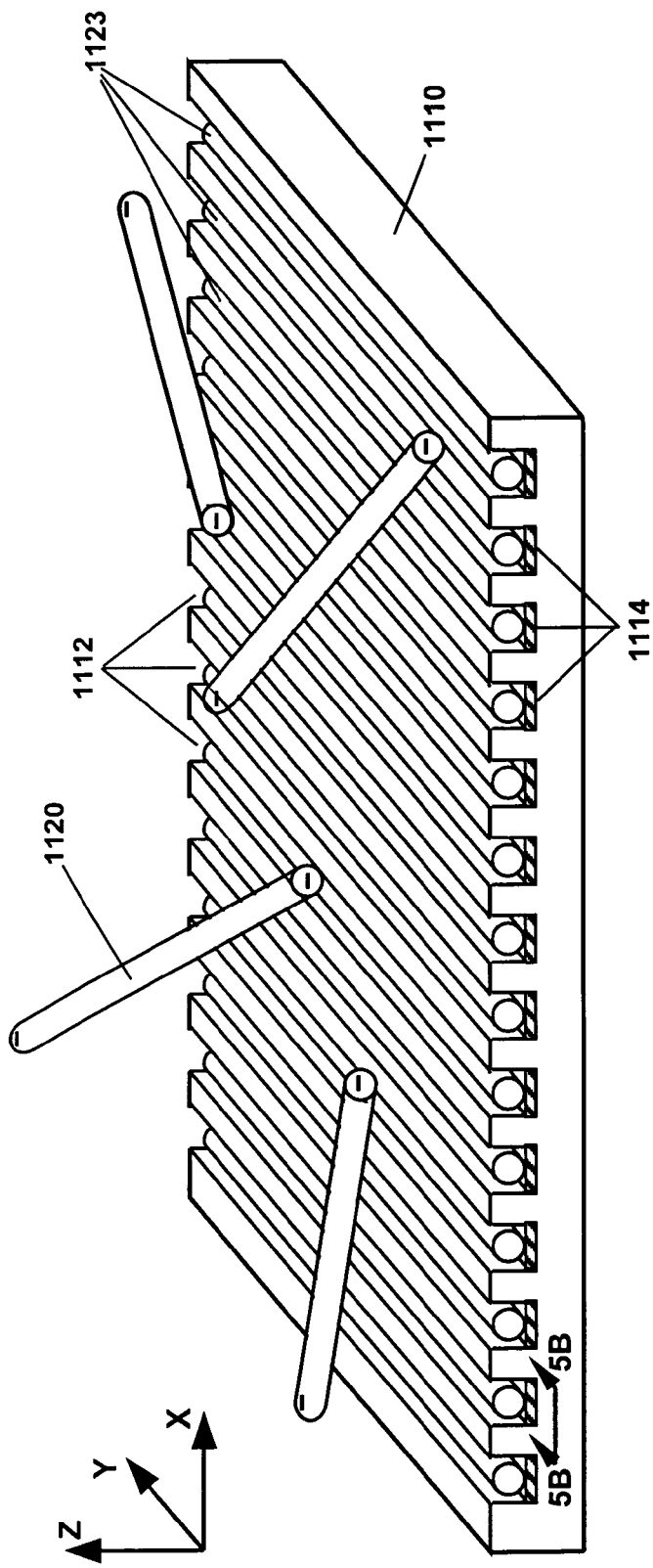
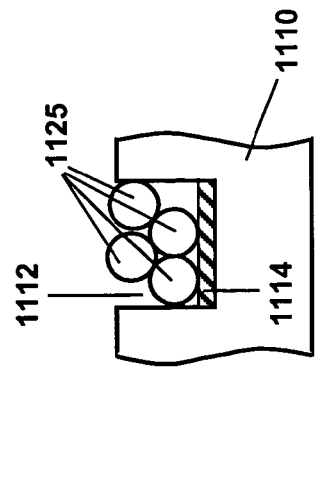
FIG. 5A
FIG. 5B
FIG. 5C

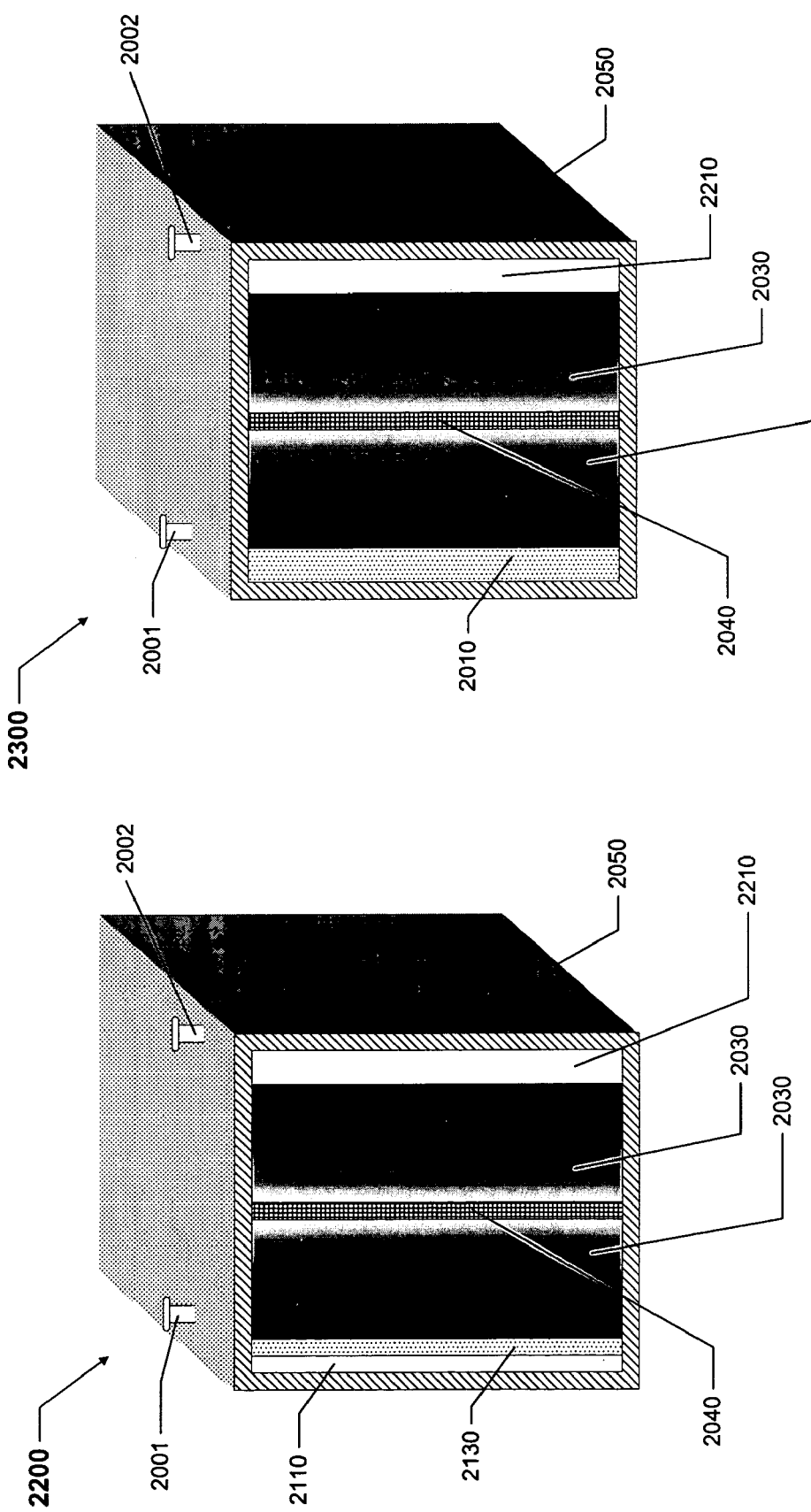

ULTRACAPACITORS COMPRISED OF MINERAL MICROTUBULES

CROSS-REFERENCE TO RELATED PATENT APPLICATIONS

This application is a continuation-in-part of copending patent application U.S. Ser. No. 11/042,219, filed on Jan. 25, 2005, the disclosure of which is incorporated herein by reference.

This invention relates in one embodiment to compositions and articles that include microtubules of halloysite clay; and more particularly to compositions comprised of halloysite clay microtubules that have high electrical capacitance, and articles comprised of halloysite clay microtubules which may be used as ultracapacitors in electrical circuits.

BACKGROUND OF THE INVENTION

1. Field of the Invention

Compositions of matter that have high electrical capacitance, and articles comprised of such compositions which may be used as ultracapacitors in electrical circuits.

2. Description of Related Art

In recent years, there have been significant advances in the preparation of new compositions of matter (and uses thereof and/or products made therefrom), such materials including microscopic tubular particles, also known in the art as tubules, microtubules, nanotubules, microtubes, and nanotubes. In certain contexts, such particles may also be referred to as rods or needles. One example of such tubular particles is the carbon nanotube, which, in various forms, may have a diameter of between about one nanometer and several hundred nanometers, and a length of up to several thousand nanometers long.

These nanotubes, and many other microtubular materials do not occur in nature, or at least not in substantial quantities that make such microtubular materials useful in formulating compositions of matter and/or products in high volume at low cost. Such microtubular materials typically must be synthesized, usually in gram-sized or smaller quantities, resulting in unit manufacturing costs for compositions or products including such microtubular materials that are exceedingly high.

In contrast, there is one type of inorganic microtubular material that does occur in nature in large quantities in mineral form. Such material belong to the kaolinite group of clay minerals, and is described in U.S. Pat. No. 5,651,976, "Controlled release of active agents using inorganic tubules," of Price et al., the disclosure of which is incorporated herein by reference. In this patent, Price et al. describe the kaolinite group of minerals as follows:

"Several naturally occurring minerals will, under appropriate hydration conditions, form tubules and other microstructures suitable for use in the present invention. The most common of these is halloysite, an inorganic aluminosilicate belonging to the kaolinite group of clay minerals. See generally, Bates et al., 'Morphology and structure of endellite and halloysite", American Minerologists 35 463-85 (1950), which remains the definitive paper on halloysite. The mineral has the chemical formula $Al_2O_3 \cdot 2SiO_2 \cdot nH_2O$. In hydrated form the mineral forms good tubules. In dehydrated form the mineral forms broken, collapsed, split, or partially unrolled tubules.

"The nomenclature for this mineral is not uniform. In the United States, the hydrated tubule form of the mineral is called endellite, and the dehydrated form is called halloysite. In Europe, the hydrated tubule form of the mineral is called halloysite, and the dehydrated form is called is called metahalloysite. To avoid confusion, mineralogists will frequently refer to the hydrated mineral as halloysite 10 Å and the dehydrated mineral as halloysite 7 Å.

"Bates et al. present data on the tubes, which is summarized below:

|  | Range (Å) | Median (Å) |
| --- | --- | --- |
| Tube diameter: | 400-1900 | 700 |
| Hole diameter: | 200-1000 | 400 |
| Wall thickness: | 100-700 | 200 |

"Tube lengths range from 0.1 to about 0.75 μm. Morphologically, both hydrated and dehydrated halloysite comprise layers of single silica tetrahedral and alumina octahedral units. They differ in the presence or absence of a layer of water molecules between the silicate and alumina layers. The basal spacing of the dehydrated form is about 7.2 Å and the basal spacing of the hydrated form is about 10.1 Å. (hence the names halloysite 7 Å and halloysite 10 Å). The difference, about 2.9 Å, is about the thickness of a monolayer of water molecules.

"A theory for the formation of hollow tubular microcrystals is presented in Bates et al. Water molecules interposed between the gibbsite ($Al_2O_3$) and silicate ($2SiO_2$) layers results in a mismatch between the layers, which is compensated by curvature of the layers.

"Halloysite 10 Å dehydrates to halloysite 7 Å at about 110° C. All structural water is lost at about 575° C. The interlayer water in halloysite 10 Å may be replaced by organic liquids such as ethylene glycol, di- and triethylene glycol, and glycerine.

"Another mineral that will, under appropriate hydration conditions, form tubules and other microstructures is imogolite.

"Another mineral that will, under appropriate conditions, form tubules and other microstructures is cylindrite. Cylindrite belongs to the class of minerals known as sulfosalts.

"Yet another mineral that will, under appropriate conditions, form tubules and other microstructures is boulangerite. Boulangerite also belongs to the class of minerals known as sulfosalts."

In addition, the term "hydrated halloysite" is used in the claims of U.S. Pat. No. 4,019,934 of Takayama et al., the entire disclosure of which is hereby incorporated by reference into this specification. Claim 1 of this patent refers to an "inorganic gel." Claim 4 of the patent recites that "4. The inorganic gel-ammonium nitrate composite material as claimed in claim 1 wherein said inorganic gel is prepared from a material selected from the group consisting of hydrated halloysite and montmorillonite." As is disclosed in column 1 of such patent, "The purified and swollen inorganic gel prepared from a clay such as montmorillonite group, vermiculite, hydrated halloysite, etc., by the manner described hereinafter contains free water, bound water, and water of crystallization . . . . "

In U.S. Pat. No. 5,651,976 of Price et al., there is disclosed and claimed in claim 1, "A composition for use in the delivery of an active agent at an effective rate for a selected time, comprising: hollow mineral microtubules selected from the group consisting of halloysite, cylindrite, boulangerite, and imogolite, wherein said microtubules have inner diameters ranging from about 200 Å to about 2000 Å, and have lengths ranging from about 0.1 μm to about 2.0 μm, wherein said active agent is selected from the group consisting of pesticides, antibiotics, antihelmetics, antifouling compounds, dyes, enzymes, peptides bacterial spores, fungi, hormones, and drugs and is contained within the lumen of said microtubules, and wherein outer and end surfaces of said microtubules are essentially free of said adsorbed active agent."

In claim 11 of U.S. Pat. No. 5,651,976 of Price et al., there is disclosed and claimed, "A composition for use in the delivery of an active agent, at an effective rate for a selected time, into a fluid use environment wherein said active agent has a limited solubility, comprising: hollow cylindrical mineral microtubules selected from the group consisting of halloysite, cylindrite, boulangerite, and imogolite, wherein said microtubules have inner diameters ranging from about 200 Å to about 2000 Å, and have lengths ranging from about 0.1 µm to about 2.0 µm, wherein said active agent is selected from the group consisting of pesticides, antibiotics, antihelmetics, antifouling compounds, dyes, enzymes, peptides, bacterial spores, fungi, hormones, and drugs and is adsorbed onto an inner surface of said microtubules, wherein said microtubules are adherently coated with a coating, wherein said coating is wettable by said fluid and by said active agent, and wherein said coating is permeable to said active agent."

Further information on the use of halloysite tubules for controlled delivery of active agents is disclosed in U.S. Pat. No. 5,705,191, "Sustained delivery of active compounds from tubules, with rational control," of Price et al., the disclosure of which is incorporated herein by reference. In this patent, Price et al. disclose a method for releasing an active agent into a use environment, by disposing such active agent within the lumen of a population of tubules, and disposing such tubules into a use environment, either directly or in some matrix such as a paint in contact with the use environment. The tubules have a preselected release profile to provide a preselected release rate curve. The preselected release profile may be achieved by controlling the length or length distribution of the tubules, or by placing degradable endcaps over some or all of the tubules in the population, or by combinations of these methods. Price et al. further disclose a preferred population of tubules having a preselected release profile to provide a preselected release rate curve for controlled delivery of the active agent. In this patent, release rates are expressed in terms of Fick's second law for unsteady state diffusion, and in terms of certain tubule length distributions.

Yet another embodiment for a method involving the use of halloysite tubules is disclosed in U.S. Pat. No. 6,401,816, "Efficient method for subsurface treatments, including squeeze treatments" of Price et al., the disclosure of which is incorporated herein by reference. In this patent, Price et al. disclose a method for delivering encapsulated materials to a subsurface environment, for the treatment of such subsurface environment, having the steps of: (a) loading the lumen of hollow microtubules with an active agent selected for treating the subsurface environment, where the hollow microtubules are compatible with the subsurface environment; and (b) administering the hollow microtubules to the subsurface environment, permitting the controlled release of the active agent into the subsurface environment. The method may be practiced using a slurry of hollow microtubules, where the lumen of these microtubules is loaded with an agent for the treatment of petroleum well environments, and where these loaded microtubules are dispersed in a liquid phase carrier selected from aqueous carriers, non-aqueous carriers, and emulsions of aqueous and non-aqueous materials. The method may also be practiced using a pill made of a consolidated mass of tubules loaded with one or more active agents, typically bound with a binder. This method of Price et al is particularly related to treating subsurface liquid reservoirs, particularly oil reservoirs. More particularly, the method relates to treating oil reservoirs to prevent and/or remedy such problems as fouling of extraction wells by scale formation, well corrosion, and souring of oil by bacterial contamination, and to treating the liquid in such reservoirs by introducing chemical or biological agents, to affect the properties of the liquid or to aid in the extraction of the liquid.

U.S. Pat. No. 4,364,857, "Fibrous clay mixtures," of Santilli discloses an application not involving the delivery of active agents from halloysite tubules, but rather the use of halloysite tubules in forming a catalyst support and a catalyst composition which have a large pore volume in 200-700 Angstroms diameter pores. With respect to a composition of matter, Santilli discloses, "codispersed rods of a first fibrous clay and a second fibrous clay, the first fibrous clay composed predominantly of fibers with a length range of 0.5-2 microns and a diameter range of 0.04-0.2 microns and a second fibrous clay predominantly composed of rods having a length range of 1-5 microns and a diameter range of 50-100 Angstroms. A preferred first clay is the tubular form of the clay halloysite and a preferred second clay is fibrous attapulgite. It is preferred that the composition be at least 5 percent attapulgite. It is preferred that the composition contain up to 15 percent of a binding refractory inorganic oxide. It is preferred that the refractory inorganic oxide be alumina. It is preferred that the catalyst body have a total pore volume of at least 0.35 cc/g and at least 60 percent of the volume of the pores is present in pores having diameters of 200-700 Angstroms. It is preferred that the composition also include at least one metal selected from the transition metals. This invention also comprises a method for hydroprocessing hydrocarbonaceous feedstocks comprising contacting the feedstocks with molecular hydrogen under hydroprocessing conditions in the presence of a catalyst having codispersed rods of a first fibrous clay having rods predominantly in the range of 0.5-2 microns with a diameter range of 0.04-0.2 microns and a second fibrous clay having rods in the range of 1-5 microns and a diameter range of 50-100 Angstroms. It is preferred that the first fibrous clay be halloysite and the second clay be attapulgite."

With regard to the halloysite tubules, U.S. Pat. No. 4,364,857 of Santilli further discloses that, "The clay halloysite is readily available from natural deposits. It can also be synthesized, if desired. In its natural state, halloysite often comprises bundles of tubular rods or needles consolidated or bound together in weakly parallel orientation. These rods have a length range of about 0.5-2 microns and a diameter range of about 0.04-0.2 microns. Halloysite rods have a central co-axial hole approximately 100-300 Angstroms in diameter forming a scroll-like structure.

"It has been found that halloysite can make a suitable catalyst for use in demetalizing and hydroprocessing asphaltenes. The halloysite is processed to break up the bundles of rods so that each rod is freely movable with respect to the other rod. When substantially all the rods are freely movable with respect to all the other rods, the rods are defined herein as 'dispersed'. When the dispersed rod clay is dried and calcined, the random orientation of the rods provides pores of an appropriate size for hydroprocessing and hydrodemetalizing asphaltene fractions.

"When halloysite rods or other rods of similar dimensions are agitated in a fluid such as water to disperse the rods, the dispersion can be shaped, dried and calcined to provide a porous body having a large pore volume present as 200-700 Angstroms diameter pores. When the shaping is by extrusion, however, it has been found that mixtures of dispersed clay rods of the halloysite type, do not extrude well. The rods on the surface of the extruded bodies tend to realign, destroying the desirable pore structure at the surface of the catalyst. This is defined herein as a 'skin effect'. It has been discovered, however, that if a second fibrous clay with longer, narrower and presumably more flexible, fibers is codispersed with the halloysite-type clay, the resulting composition is easily extrudible, and there is no significant skin effect. 'Codispersed' is defined herein as having rod- or tube-like clay particles of at least two distinct types substantially randomly oriented to one another."

It will be apparent from the disclosures of these United States patents of Price et al., and of Santilli, and from other known art pertaining to the controlled delivery of active agents from microtubules, that in many circumstances, it is desirable to provide and use a population of tubules for which the degree of purity and the tubule diameter and/or length distribution are known, and are preferably deterministically selectable. For the various active agents disclosed by Price et al. in the '976 patent, i.e., "pesticides, antibiotics, antihelmetics, antifouling compounds, dyes, enzymes, peptides, bacterial spores, fungi, hormones, and drugs," it will be apparent that in processes and comprising such active agents, it will be necessary to deliver such active agents with a high degree of control. Accordingly, the degree of purity and the tubule diameter and/or length distribution for the halloysite tubules to be used may not be left to chance, i.e. "as delivered" directly from the mining operation.

Halloysite is mined and sold commercially from mines in New Zealand and in Juab County, Utah. Reference may be had to http://www.atlasmining.com/dragonmine.html, the web site of the Atlas Mining Company of Osborn, Id. which describes and shows certain operations of the Dragon Mine in the Tintic Mining District in Joab County, Utah. Although the halloysite clay obtained from the Dragon Mine is among the highest in purity and in proportion of microtubules, such halloysite clay is not obtained in a state that is suitable for direct use as a vehicle for loading and controlled release of active agents, or for use in other high precision applications such as e.g., ultracapacitors for use in electrical and electronics circuits and devices.

There has been an increased demand for portable energy storage devices in recent years due to the proliferation of portable electronics, cordless appliances, and a focus on renewable energy in applications such as hybrid gas/electric vehicles. Two common ways to store electrical energy in a portable package are batteries and capacitors. Unfortunately, standard capacitor technologies do not allow for sufficient energy storage for many of today's power applications.

In the 1950's and 1960's, it was observed that certain types of capacitors, specifically electrolytic capacitors, exhibit an electric double layer phenomenon. The storage of electric charge at the boundary of a metal and an electrolyte solution has been observed as far back as the nineteenth century. This charge storage phenomenon was later noted in electrolytic capacitor designs in the 1950's and 1960's. In 1969, Union Carbide Corporation filed a patent application, later issued as U.S. Pat. No. 3,581,159 entitled "Solid Electrolyte Capacitor Having Improved Counterelectrode System" that uses carbon particles to increase the capacitance of an electrolytic capacitor. The carbon particles exhibited an electric double layer phenomenon where additional charge was stored in and around the carbon particles that were added to the electrodes of an electrolytic capacitor. The Union Carbide patent attributed the increased capacitance in part to the increased surface area of the electrode due to the added carbon particles. U.S. Pat. No. 3,648,126, "Electrical Capacitor Employing Paste Electrodes," discloses an electrolytic capacitor that uses a pair of paste electrodes made from active carbon and powdered metal to maximize the electrode/electrolyte surface area by providing a highly porous carbon electrode which forms extensive boundary surfaces on exposure to an electrolyte, thus forming a high surface area electrical double layer.

There have been recent attempts to increase the overall capacitance of an electrochemical capacitor by using techniques such as those disclosed in U.S. Pat. No. 6,704,192 entitled "Electrically Conductive, Freestanding Microporous Sheet For Use in an Ultracapacitor". The '192 patent uses a microporous polymer sheet as an electrode in an electrochemical capacitor to create an electric double layer.

The growing demand for portable energy storage devices has created a renewed interest in new ways to create the electric double layer in capacitors that may increase the electrical charge storage potential of certain classes of electrochemical capacitors that are known as ultracapacitors or supercapacitors.

Accordingly, embodiments of the present invention are provided that meet at least one or more of the following objects of the present invention.

It is an object of the present invention to provide an electrode formed from mineral microtubules contained in a paste or a gel that can be used in an ultracapacitor.

It is a further object of the present invention to provide an electrode formed from mineral microtubules that are coated or embedded in a conductive polymer that can be used in an ultracapacitor.

It is yet another object of the present invention to provide a composite electrode formed from mineral microtubules that can be used in an ultracapacitor.

It is another object of the present invention to provide a hybrid electrode formed from mineral microtubules that can be used in an ultracapacitor.

It is still another object of the present invention to provide a hybrid composite electrode formed from mineral microtubules that can be used in an ultracapacitor.

It is a further object of the present invention to provide an ultracapacitor comprised of mineral microtubules wherein such ultracapacitor has high electrical capacitance.

SUMMARY OF THE INVENTION

In accordance with the present invention, there is provided an ultracapacitor comprising a first electrode containing mineral microtubules, a second electrode containing mineral microtubules, an electrolyte disposed between said first electrode and said second electrode, and a separator disposed in said electrolyte to provide electrical insulation between said first electrode and said second electrode, while allowing ion flow within said electrolyte. In some embodiments, the electrodes may be formed from a paste containing mineral microtubules, or may consist essentially of a conductive polymer containing mineral microtubules, or an aerogel containing the mineral microtubules. In some embodiments, the mineral microtubules may be filled with carbon, a psuedocapacitance material, or a magnetoresistive material. The mineral microtubules may also be coated with a photoconductive material. In preferred embodiments, the mineral microtubules are halloysite microtubules.

In accordance with the present invention, there is further provided an ultracapacitor comprising a first base electrode; a first electrode coating deposited on said first base electrode wherein said first electrode coating contains mineral microtubules; a second base electrode; a second electrode coating deposited on said second base electrode wherein said second electrode coating contains mineral microtubules; an electrolyte disposed between said first electrode coating and said second electrode coating; and a separator disposed in said electrolyte to provide electrical insulation between said first electrode coating and said second electrode coating, while allowing ion flow within said electrolyte.

BRIEF DESCRIPTION OF THE DRAWINGS

The invention will be described by reference to the following drawings, in which like numerals refer to like elements, and in which:

FIG. 5A is a perspective view of halloysite nanotubules deposited in the microchannels of the substrate of FIG. 4;

FIG. 5B is a side elevation view of a halloysite nanotubule deposited in a microchannel of the substrate of FIG. 5A, taken along the line 5B-5B of FIG. 5A;

FIG. 5C is a side elevation view of a plurality of halloysite nanotubules deposited in a microchannel of the substrate of FIG. 4;

FIG. 15 is a cross sectional view of an ultracapacitor having a hybrid electrode configuration wherein one electrode is a composite electrode with a mineral microtubule coating;

FIG. 16 is a cross sectional view of an ultracapacitor having a hybrid electrode configuration wherein one electrode contains mineral microtubules;

Figure 1:
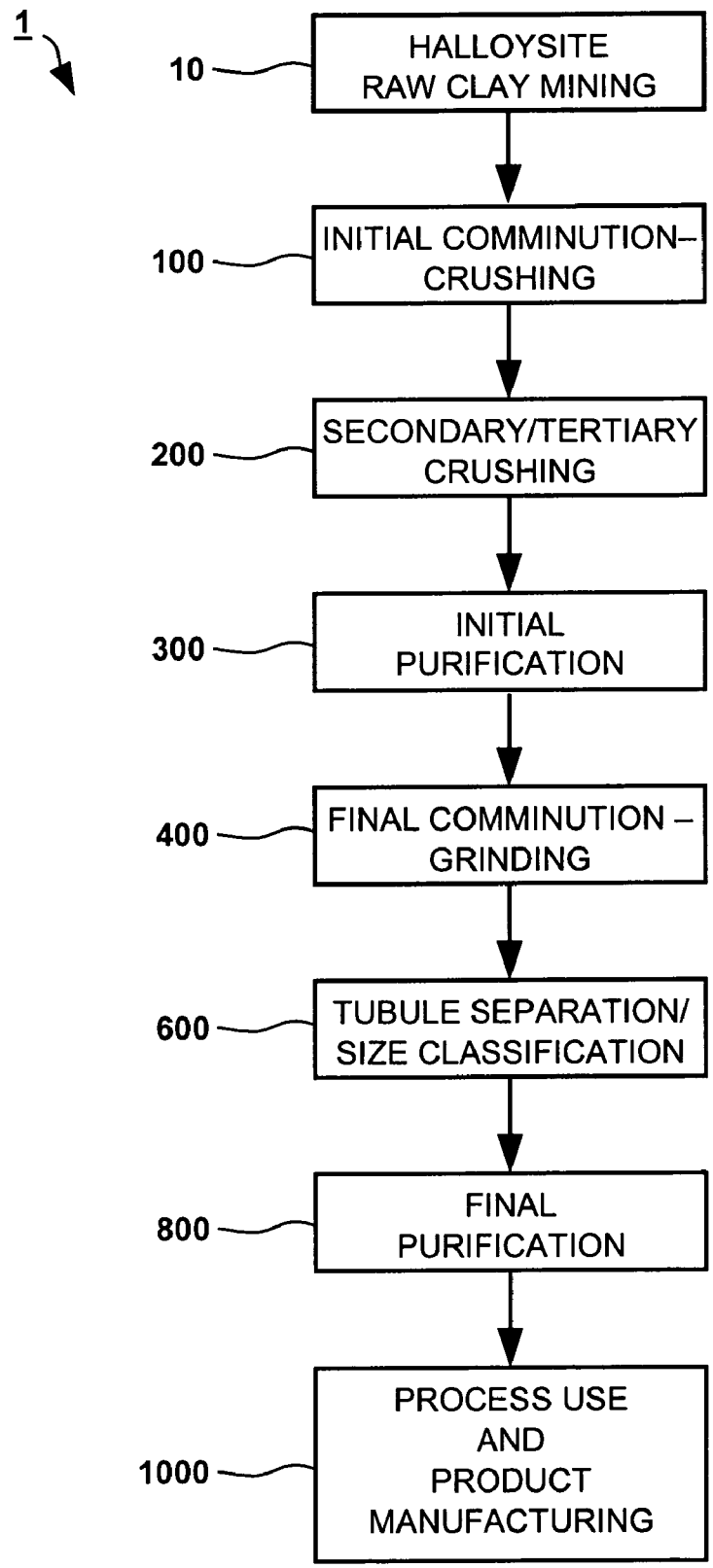
FIG. 1 is a flow diagram of a general process for converting a mined microtubule clay mineral into a product, or for preparing such mineral for use in a process.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENTS

For a general understanding of the present invention, reference is made to the drawings. In the drawings, like reference numerals have been used throughout to designate identical elements. In describing the present invention, a variety of terms are used in the description. Standard terminology is widely used in mineral processing, separation, and purification art. For example, one may refer to the *SME Mining Engineering Handbook,* 2nd Ed. Volume 1, 1992, published by the Society for Mining, Metallurgy, and Exploration. One may also refer to *Mineral Processing Technology,* 6$^{th}$ Ed, B. A. Wills, Butterworth Heinemann, 1997. With regard to liquid filtration technology, one may refer to the "Filter and Filtration Handbook", 4th Ed., T. Christopher Dickenson, Elsevier Advanced Technology, 1997.

With regard to liquid filtration and the handling of multiphase fluids, a variety of terms are used in the description. As used herein, a two phase fluid is meant to be a fluid comprising a liquid phase in which either substantially solid particles are dispersed therethrough, or a first liquid phase in which droplets or particles of a second liquid phase immiscible with such first liquid phase are dispersed through such first liquid phase. A multiphase fluid is meant to be a fluid comprising a first liquid phase in which at least one additional second solid or liquid phase is dispersed therethrough.

As used herein, a particle is meant to be a discreet liquid droplet or a solid object, with a characteristic dimension such as a diameter or length of between about one nanometer, and about several centimeters. The particular size of particles in a fluid being processed will depend upon the particular application.

As used herein, a dispersion is meant to be any fluid comprising a liquid phase in which substantially solid particles are suspended, and remain suspended, at least temporarily.

As used herein, a slurry is meant to be any fluid comprising a liquid phase in which substantially solid particles are present. Such particles may or may not be suspended in such fluid.

As used herein, the terms microtubule and nanotubule are used interchangeably, and are to be taken to mean a microscopic cylindrical tubular shaped material entitie having a diameter between about 10 and about 500 nanometers, and a length of between about 100 and about 5000 nanometers.

As used herein, the term composite electrode is meant to be an ultracapacitor electrode that is made from more than one material.

As used herein, the term hybrid electrode is taken to be a capacitive structure that contains electrodes of different material compositions.

FIG. 1 is a flow diagram of a general process for converting a mined microtubule clay mineral into a product, or for preparing such mineral for use in a process. Referring to FIG. 1, process 1 begins with the step 10 of mining of halloysite raw clay. In the as-mined condition, the raw halloysite clay comprises halloysite platelets and halloysite tubules (to be described subsequently in this specification), and various undesired other heterogeneous material, i.e. rocks and dirt comprised of other minerals.

In such cases as when the raw mined clay is comprised of numerous large solid objects, e.g. large rocks and/or large chunks of clay, the raw mined clay may undergo an initial comminution step 100 wherein such large structures or lumps are crushed down into smaller, more uniformly sized pieces that can be further processed. The initial comminution step may be performed by e.g., a jaw crusher or a gyratory crusher in circumstances where the mined raw clay contains hard rock material. The structure and operation of such crushers are described in detail in the aforementioned *SME Mining Engineering Handbook*, Chapter 25, sections 25.3.1.2-25.3.1.5. In initial comminution step 100, the maximum size of lumps in the mined raw clay is reduced down to no greater than about one inch.

Initial comminution 100, when utilized, is followed by secondary and/or tertiary comminution/crushing 200. The objective of secondary/tertiary crushing is to break the mined clay and entrained foreign material (rocks/lumps comprising other minerals) down to a size that is granular, wherein the foreign material has fractured from and is thus separable from the halloysite clay. It is also preferable that the secondary/tertiary crushing breaks the mined clay down to a granule size that is several orders of magnitude greater that the length dimension of a halloysite microtubule, i.e. on the order of about 0.1 inch or about 2 millimeters.

Suitable apparatus for secondary and/or tertiary crushing 200 include cone crushers such as the Nordberg® Symons, Omnicone, Gyrodisc, or Waterflush™ Wet Cone crusher, all of which are manufactured and sold by Metso Minerals Industries Inc. of Danville Pa. With regard to the Waterflush™ Wet Cone crusher, it is noted at Chapter 25, page 2190, of the aforementioned SME Mining Engineering Handbook, "Wet Cone crushers (WF Series) use Waterflush™ technology in which water is added to the crusher to flush fines through the crushing cavity. It is claimed that flushing produces a significant amount of flaky, shaped particles that break easily during ball milling." This capability is advantageous, since it is preferred that minimal attrition be performed at the nanoscale level which would result in the crushing or length reduction of the halloysite tubules.

The aforementioned cone crushers are generally intended for processing of large volumes of clay mineral, on the order of many tons. In the event that a smaller batch of the raw or initially comminuted clay is to be processed, there are alternate "lab scale" crushers that are sized for the processing of volumes from about ten pounds to about one ton of clay feedstock. One may use the Marcy® 3149 or Marcy® 4100 Laboratory Reduction Cone Crusher; the Marcy® 6000 or Marcy® 8000 Laboratory Double Roll Crusher; the Nordberg® AR12 laboratory jaw crusher; or the Nordberg® B90 laboratory cone crusher to attain a size reduction down to about 10 mesh (about 0.08 inches), all of which are manufactured and sold by Metso Minerals Industries Inc. of Danville Pa.

Following secondary/tertiary crushing 200 is the optional step of initial purification 300. In this step, a separation is made wherein particles consisting essentially of halloysite clay are separated from particles consisting of other minerals and/or other foreign material. In one embodiment wherein a large share of the foreign material is of a different specific gravity than the halloysite clay particles, the crushed material from secondary/tertiary crushing 200 is dispersed in a liquid to form a slurry. The slurry may be delivered through a hydrocyclone, thereby separating the foreign material of different specific gravity. The hydrocyclone may also be used to classify particles of the same specific gravity but of different diameter (or other characteristic dimension). Further details on the structure and operation of hydrocyclones may be found in the *SME Mining Engineering Handbook*, Chapter 25, section 25.3.4, and Mineral Processing Technology, $6^{th}$ Ed, B. A. Wills, Butterworth Heinemann, 1997, Chapter 9. Alternatively, Dense Medium Separation (DMS) may be employed, wherein the slurry is formed using a dense liquid such as a suspension of particles of high specific gravity. The slurry may then be processed in a centrifugal separator. Further details on the structure and operation of centrifugal separators may be found in the aforementioned *Mineral Processing Technology*, Chapter 11.

The liquid that is used as a medium to fluidize the solid particles in the slurry may also serve as a solvent that dissolves undesirable soluble foreign material, thereby washing such material from at least the exterior regions of the halloysite clay granules and fines. For environmental reasons, the preferred suspending liquid is an aqueous medium, e.g. water. However, the aqueous medium can be made acidic or basic in order to leach out trace inorganic impurities that are more soluble in a non-neutral aqueous medium. In one embodiment, the slurry is made basic with a concentration of 0.5 molar sodium hydroxide at 60 degrees centigrade for 8 hours, in order to dissolve any allophane (a natural amorphous precursor to tubular halloysite), as is disclosed in "Characterization of halloysite for use as a microtubular drug delivery system," Levis et al., *International Journal of Pharmaceutics* 243 (2002), page 126. However, such a procedure may not be preferable, there is a tradeoff in that such procedure may be detrimental to the halloysite tubules as disclosed on page 132 of this publication.

Following the step of initial purification 300, there is performed the step 400 of final comminution to break the agglomerated halloysite clay granules and fines down into disassociated individual halloysite microtubules and platelets that can be subsequently further separated and classified (step 600), further purified (step 800); and then subsequently used in processes and/or product manufacturing (step 1000).

There are many well known methods in mineral processing for further size reduction from granules on the order of 0.1 inch in diameter to particle sizes on the order of microns. This process is generally referred to in the mineral processing industry as grinding, and may be performed using equipment that either tumbles the mineral feedstock together with grinding media in a rotating vessel, or shears the material between two surfaces forced together and moving in opposite directions. Examples of rotating vessel grinding equipment are ball mills, rod mills, stirred media detritors, and the Vertimill™ by Metso Minerals Industries Inc., all of which use ball or rod-shaped grinding media of steel, other hard metal alloys, or ceramic. An example of a shearing grinding apparatus is the disc grinder.

As is the case for crushing equipment, there are many manufacturers of grinding apparatus capable of grinding mineral feedstock volumes on the order of many tons. Manufacturers also provide pilot plant and laboratory apparatus for the processing of material volumes of about ten pounds to about one ton. For example, one may use a the Marcy® 2891 or Marcy® 3182 Laboratory Disc Pulverizer, or the 5000

Morse® 8" by Metso Minerals Industries Inc., to reduce the particle size to a 100 mesh (i.e. less than about 150 microns). There are also many well known small scale ball mills and attritors for fine particle milling of pigments for the formulations of paints, photoconductive coatings, and the like.

In the *SME Mining Engineering Handbook*, Chapter 25, section 25.3.2, Callow and Kenyen define grinding as "the further reduction of crushed products to a size suitable for a subsequent concentration process." In the Metso Minerals Industries Inc. Brochure No. 1727-10-03-MPR/York-English, the following definition is provided: "'Grind' To crush, pulverize, or powder by friction especially by rubbing between two hard surfaces."

Figure 12:
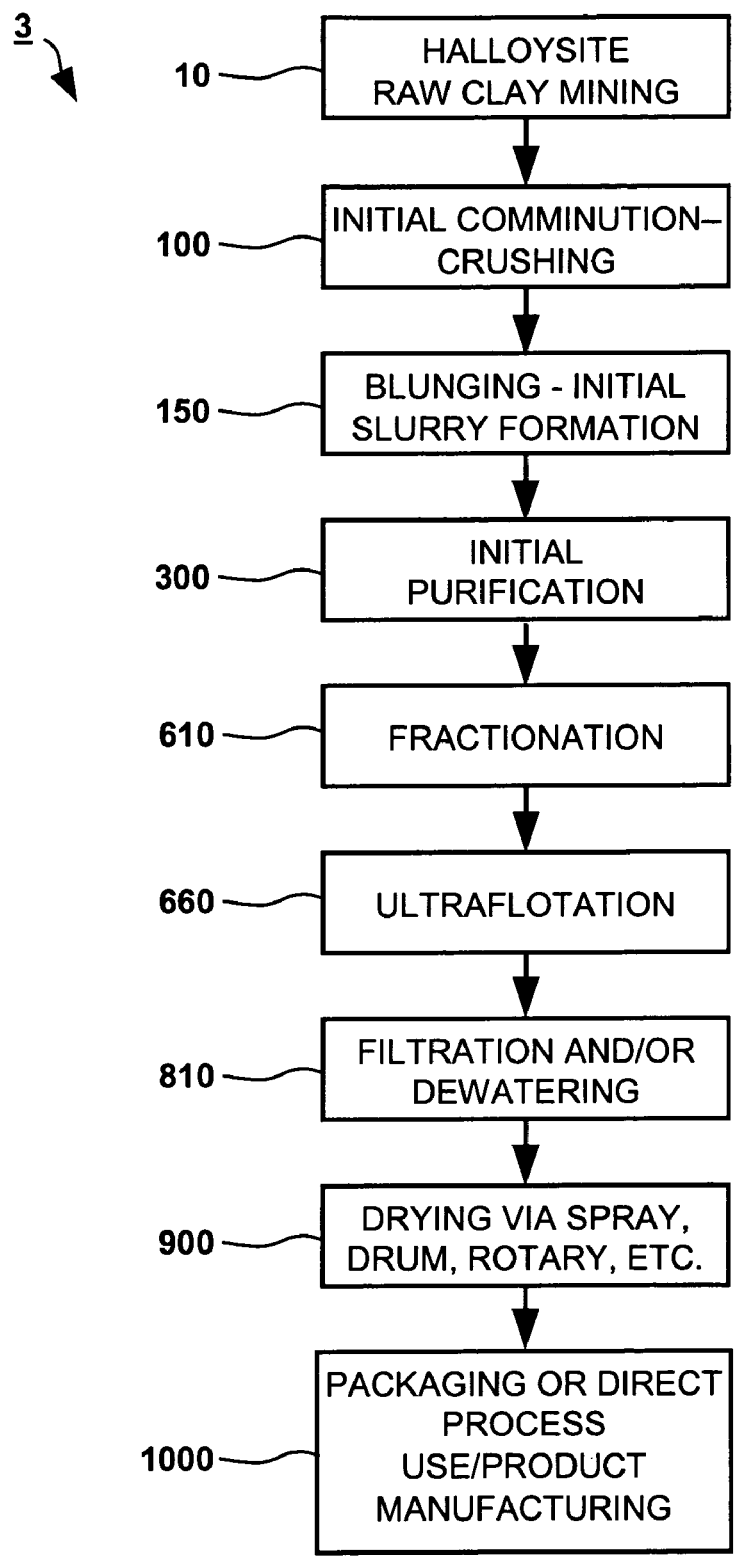
FIG. 12 is a flow diagram of an alternate general process for converting a mined microtubule clay mineral into a product, or for preparing such mineral for use in a process.

FIG. 12 is a flow diagram of an alternate general process for converting a mined microtubule clay mineral into a product, or for preparing such mineral for use in a process. Referring to FIG. 12, process 3 begins with the step of halloysite raw clay mining 10, optionally followed by initial comminution 100 if some size reduction of the raw clay ore is needed prior to purification.

Following the step of mining 10 and comminution/grinding 100 (if such step is performed), the halloysite clay ore is then subjected to blunging 150 in which the ore is added to a stirred vessel containing a liquid (typically water). The vessel is provided with baffles or other protrusions from the walls, and the mixing is performed at sufficiently high shear so as to fragment the clay into a liquid slurry. A dispersing agent may be added to the liquid to facilitate slurry formation. In one embodiment, high energy sonicators are provided in the vessel walls and/or bottom to provide additional energy for reducing the size of the clay particles in the slurry. An initial purification 300 is performed in which insoluble non-clay grit is removed from the slurry. This degritting process may be performed by delivering the slurry through a mesh screen type filter.

Following the degritting process 300, the halloysite clay slurry is subjected to more rigorous purification steps. In one embodiment (not shown), the halloysite clay slurry may undergo a wet pulverization process, as is disclosed in U.S. Pat. No. 3,915,731, "Aqueous composition containing color former for pressure sensitive production," of Sugahara et al., the disclosure of which is incorporated herein by reference. In such patent there is disclosed a process of wet pulverization of a clay slurry or its acid-treated product in a liquid medium comprising (a) water, (b) an organic solvent, or (c) a mixture of the organic solvent and water. It is required, however, that the wet pulverization process not be sufficiently aggressive so as to fracture a large portion of the population of nanotubules of the halloysite.

In another embodiment, the halloysite clay may be subjected to fractionation 610, wherein the clay is classified into two grades. At this step, the larger halloysite clay particles are separated from the small agglomerates of nanotubules and platelets and the individual nanotubules/platelets, typically by the use of a drag and bowl classifier or a cyclone separator. The slurry of the small agglomerates and individual tubules and platelets may then be subjected to ultraflotation 660, wherein certain impurities such as titanium dioxide in the form of anatase are removed in the flotation froth.

The clay slurry is then subjected to further filtration and/or dewatering 810, in which a solid cake of the halloysite clay is produced prior to drying step 900 in which the powdered halloysite is produced by spray drying or by a drum or rotary dryer. In certain embodiments, the comminution and filtration process comprised of sonication, followed by cross-flow filtration of the slurry is performed alternatively or additionally to steps 610, 660, and 810, in order to separate and prepare a slurry consisting essentially of halloysite nanotubules in suspension. Such a comminution and filtration process is described subsequently in this specification. In another embodiment, the halloysite clay slurry undergoes a process to formulate a stable suspension of halloysite particles from such slurry. In this manner, large particles cannot be rendered a part of the stable suspension wherein they are buoyant in the liquid phase, and such particles settle by gravity, or can be made to settle and become separable by centrifugation. In contrast, smaller particles, and in particular, the halloysite tubules, can be made stable in suspension. Stable liquid suspensions comprised of halloysite particles are disclosed in U.S. Pat. No. 6,667,354, "Stable liquid suspension compositions and suspending mediums for same," of Fox et al., the disclosure of which is incorporated herein by reference. Following the preparation of such a stable suspension in which the halloysite tubules remain suspended, such suspension may undergo further separation processes such as electrophoretic separation, cross-flow filtration, and/or ultracentrifugation. In circumstances wherein the halloysite particles have been coated with a magnetic material, such slurries may be subjected to a magnetic separation process.

It is further noted that in current mineral processing art, there are provided numerous methods and apparatus to grind halloysite clay down to a particle size on the order of one micron or less. Although it may be acceptable to grind halloysite feedstocks down to particle sizes on the order of 100 mesh, for example, by the aforementioned disc pulverizers, it is generally not preferred to further grind such material because of the crushing of tubules and/or reduction in the population of long tubules that results from such grinding. As is disclosed in "Characterization of halloysite for use as a microtubular drug delivery system," Levis et al., *International Journal of Pharmaceutics* 243 (2002), at page 132 in reference to a halloysite milling procedure, "As maximizing inter-tubular pore volume is likely to be an important location for drug loading for sustained release, both the allophane removal treatment and the milling procedure, in particular, have a detrimental effect on this pore volume." Accordingly, there is provided in the present invention certain methods and apparatus for deagglomeration of granules of halloysite clay without significant damage to the microtubules comprising such clay.

A Preferred Halloysite Clay Comminution and Filtration Process

In one embodiment, high energy sonication of a slurry of halloysite granules and fines is performed. One may use the method and apparatus disclosed in U.S. Pat. No. 6,797,342, "Deflocculation apparatus and methods thereof" of Sanchez et al., the disclosure of which is incorporated herein by reference. In this patent, there is disclosed a method for sonicating a stream containing a dispersion comprised of agglomerated primary particles; and filtering the resulting sonicated stream containing a dispersion comprised of de-agglomerated primary particles; and an apparatus for performing such method including an ultrasonic adapter to ultrasonicate a stream of a liquid dispersion of agglomerated primary particles; and a filter member adapted to filter the resulting ultrasonicated stream containing a dispersion of de-agglomerated primary particles.

At column 5 of the '342 patent of Sanchez et al., it is disclosed that, "In the present invention, agglomerated dispersion refers to a dispersion of particles wherein, for example, the base or primary particle size is smaller than the agglomerated particle size. The 'agglomerated particle size' refers to at least the sum of the diameters of at least two primary particles and which particles are in close physical contact, and are optionally held together by at least some force and which force can be weak forces, intermediate forces, strong forces, or combinations thereof. A 'primary particle' refers to the smallest constituent particle size, that is a building block particle and which building block particle is the smallest constituent particle size that is common to all other particles or a constituent of a larger particle or particles, or it can be a combination of two or more primary particles which combination forms an aggregate or agglomerate of primary particles.

"In embodiments of the present invention the sonication work and its accompanying transformation of particle forms can be accomplished with a sonicator, for example, at least one ultrasonic member, such as an ultrasonicator with from one to about 10 ultrasonic horn. The method of the present invention can further include, if desired, separating the de-agglomerated primary particles from the stream in the resulting sonicated stream."

Hence the method and apparatus of Sanchez et al. provide at least one ultrasonicator immersed in a fluid stream in close proximity to a filtration apparatus and process, wherein deflocculated particles are delivered through the filter medium, and flocculated particles are prevented from passing through the filter medium due to their greater size. In the present invention, a filtration process is provided wherein an ultrasonicator is used to deagglomerate microparticles, i.e. microplatelets and microtubules from the surfaces of much larger halloysite clay particles, fines or granules provided in the slurry feedstock. The microtubules (and possibly the platelets) are delivered through the filter medium, while the larger particles are blocked from passing through such medium. In another embodiment, alternatively or additionally, vibratory assistance is provided to the filtration process, as is disclosed in U.S. Pat. No. 4,741,841, "Method and apparatus for particle separation" of Borre et al., the disclosure of which is incorporated herein by reference. Such vibratory assistance may be provided either directly to the filter medium, or to the filter housing, wherein the vibrational energy is propagated to the halloysite particles and/or the filter medium through the liquid phase between the filter housing and the filter medium.

In the preferred embodiment, the process of cross flow or tangential filtration is used as a filtration process. As used herein, the term crossflow in reference to filtration is meant to denote a filtration configuration in which a flowing fluid is directed along the surface of a filter medium, and the portion of fluid that passes through such filter medium has a velocity component which is "cross-wise", i.e. perpendicular to the direction of the fluid flowing along the surface of such filter medium. As used herein, the term tangential filtration is meant to denote a filtration process in which a flowing fluid is directed substantially parallel (i.e. tangential) to the surface of a filter medium, and a portion of fluid passes through such filter medium to provide a filtrate. The terms tangential filtration and crossflow filtration are often used interchangeably in the art.

As used herein, in the tangential or other filtration process described herein, the portion of the fluid that passes through the filter medium and out through a first outlet port in the filter device that is operatively connected to such filter medium is referred to as a filtrate. The portion of the fluid that flows along the surface of the filter medium, but does not pass through such filter medium, and passes out through a second outlet port in the filter device that is operatively connected to such filter medium is referred to as a decantate.

Crossflow filtration and tangential filtration are well known filtration processes. Reference may be had e.g., to U.S. Pat. Nos. 5,681,464, 6,461,513; 6,331,253, 6,475,071, 5,783,085, 4,790,942, the disclosures of which are incorporated herein by reference. Reference may also be had to "Filter and Filtration Handbook", 4th Ed., T. Christopher Dickenson, Elsevier Advanced Technology, 1997.

In one embodiment, the cross flow filters disclosed in United States published application 2004/0173531A1, "Fluid separation and delivery apparatus and method," of Hammond may be used for separation of the microparticles that are spalled from the larger halloysite particles in the slurry feedstock. In particular, the filters shown and described in FIG. 3, FIG. 7, and/or FIG. 14, as well as the overall fluid separation apparatus shown in FIG. 8 or FIG. 9 may be used for such separation. The entire disclosure of this United States published application is incorporated herein by reference.

In a further embodiment, there is provided an on-line system for the characterization and monitoring of the halloysite microparticles in the filtrate from the filtration process. One such system is disclosed in U.S. Pat. No. 6,195,443, "System using on-line liquid characterization apparatus," of Hammond et al., the disclosure of which is incorporated herein by reference. As described in the Abstract of this patent, the characterization system is comprised of "(b) a first member and a second member, each having a flat surface, wherein the flat surface of the first member faces and is spaced from the flat surface of the second member, thereby defining a gap region between the two flat surfaces, wherein a section of the first member is transparent through the thickness of the first member; (c) a liquid delivery system connected to the vessel and the gap region which delivers the liquid to the gap region and the liquid flows in the gap region in view of the transparent section of the first member;

(d) a camera positioned to view through the transparent section of the first member; (e) image processing means coupled to the camera for determining the homogeneity of the liquid in the gap region."

This characterization system may be used to characterize the halloysite microplatelets and microtubules suspended in the filtrate being discharged from the filtration process, and may be further used to characterize the halloysite microtubules in the purification step 800 and the process use and product manufacturing steps 1000 of FIG. 1.

Figure 2:
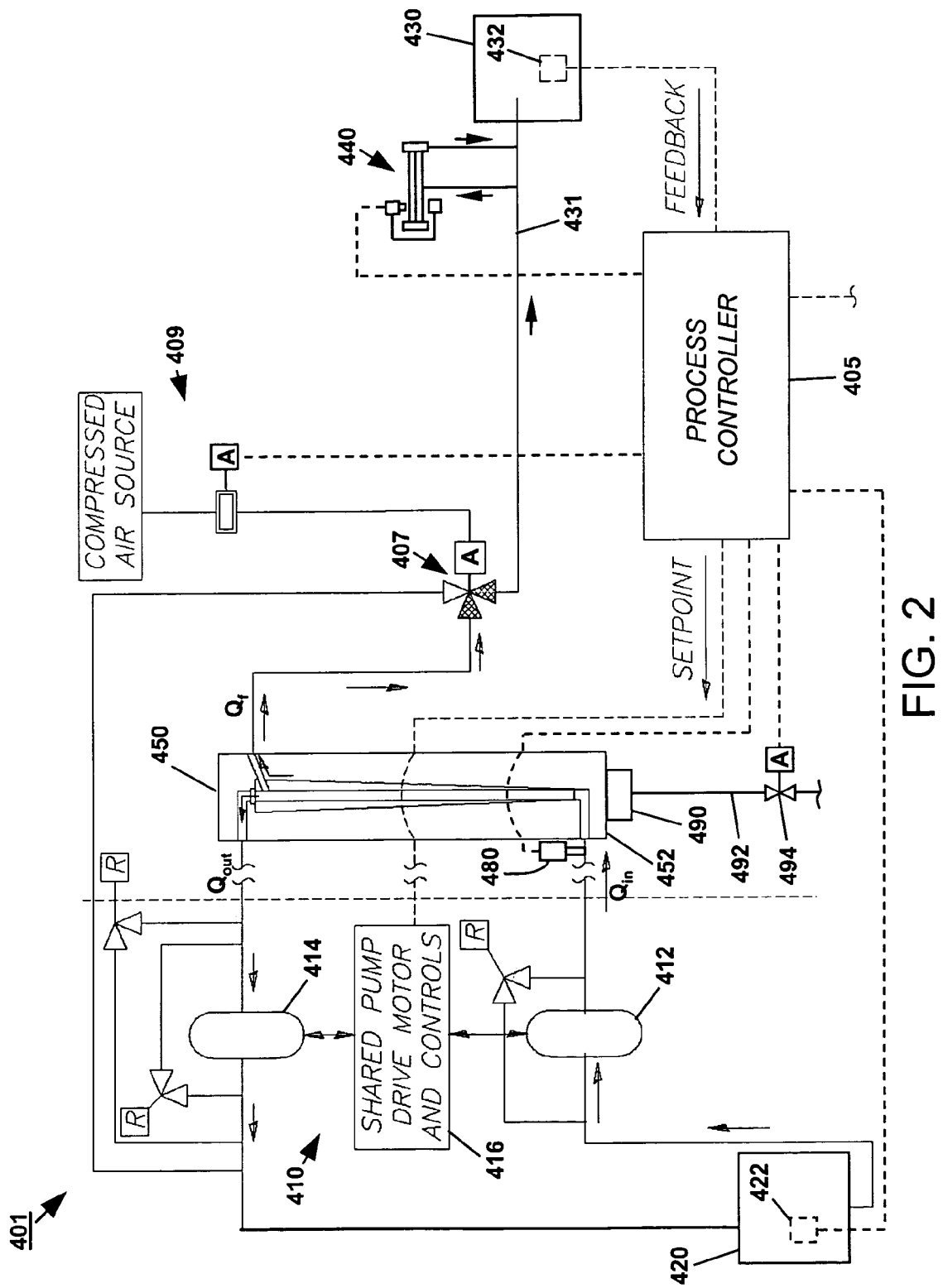
FIG. 2 is a schematic diagram of one preferred process for performing the step of final comminution of halloysite clay particles without substantial crushing or length reduction of the microtubules thereof.

FIG. 2 is a schematic diagram of one preferred process for performing the step 400 of FIG. 1, of final comminution of halloysite clay particles without substantial crushing or length reduction of the microtubules thereof. Referring to FIG. 2, process 401 comprises a filter 450, which is preferably a cross flow filter. Filter 450 is supplied a slurry of halloysite feedstock from source 420 by pumping means 410. Source 420 may be a blunging vessel containing the feedstock slurry, or source 420 may include an upstream comminution process that provides the slurry.

Pumping means 410 may be any suitable liquid pumping device for providing slurry to filter 450. In the preferred embodiment depicted in FIG. 2, pumping means 410 comprises a first positive displacement pump 412 delivering fluid to filter 450 at a flow rate of $Q_{in}$, and a second positive displacement pump 414 delivering decantate fluid back to source 420 at a flow rate of $Q_{out}$, or to a separate slurry process (not shown). The resulting rate of filtrate flow through the filter medium of filter 450 is $Q_f$, which is equal to $Q_{in}-Q_{out}$. In the preferred embodiment, pumps 412 and 414 share a common pump drive motor and controls 416, so that rate of filtrate flow $Q_f$ is controlled by a single setpoint variable, pump motor rotational speed. Positive displacement pumps 412 and 414 may be any suitable positive displacement pumps designed to handle liquid slurries containing solid particles, such as e.g. diaphragm pumps.

Filtrate containing the halloysite tubules is delivered from filter 450 through valve 407 to process 430. Process 430 may be a slurry holding and mixing vessel, a drying process, another filtration and/or dewatering process such as e.g., a centrifuge, a filter press, or a tube press, a separation and classification process such as e.g. a froth flotation process as described in the aforementioned *Mineral Processing Technology*, Chapter 12, or a process that directly uses the filtrate to produce a product comprised of the halloysite tubules. Diverter valve 407 and associated control means 409 serve to recycle the filtrate back to source 420 in the event that flow to process 430 must be temporarily interrupted.

In the preferred embodiment, a sonicator 480 that is a source of ultrasonic energy is provided at the inlet or in the housing 452 of filter 450. Filter 450 is also optionally provided with a vibration source 490 that is securely fastened to housing 452 of filter 450. In one embodiment, vibration source 490 is a pneumatic vibrator that is supplied compressed air through conduit and control valve 494. In operation, high energy ultrasonic waves and/or vibrational energy are provided to the flowing feedstock in close proximity to the filter medium. Individual tubules, platelets, and/or small agglomerates spall from the larger halloysite particles in the slurry flowing along the surface of the filter medium. The pore size and/or shape, or screen mesh size and/or shape are provided such that the tubules, platelets, and/or small agglomerates pass through the filter medium as filtrate, and are delivered to process 430. The decantate slurry containing the remainder of the large particles are returned to the source vessel or process 420.

The filtrate slurry containing the halloysite microparticles flowing in conduit 431 to process 430 may be intermittently or continuously monitored with an on-line characterization system 440 such as is disclosed in U.S. Pat. No. 6,195,443 of Hammond et al. Alternatively or additionally, such characterization system 440 may be connected to process 430 which receives and further purifies, classifies, or uses the filtrate.

Referring again to FIG. 2, process 401 is preferably provided with a computer based process controller 405 that may receive data from source process sensor 422 and filtrate destination process sensor 432, characterization system 440, and other sensors (not shown). Controller 405 controls the operation of pump means 410, sonicator 480, vibrator 490, diverter valve 407, and characterization system 440. Process controller 405 may also control source process 420 and destination process 430. In a further embodiment, process controller 405 comprises image analysis software for receiving image data from characterization system 440, performing shape and size recognition algorithms, and quantifying the population distribution of tubules and platelets in the filtrate.

Figure 3:
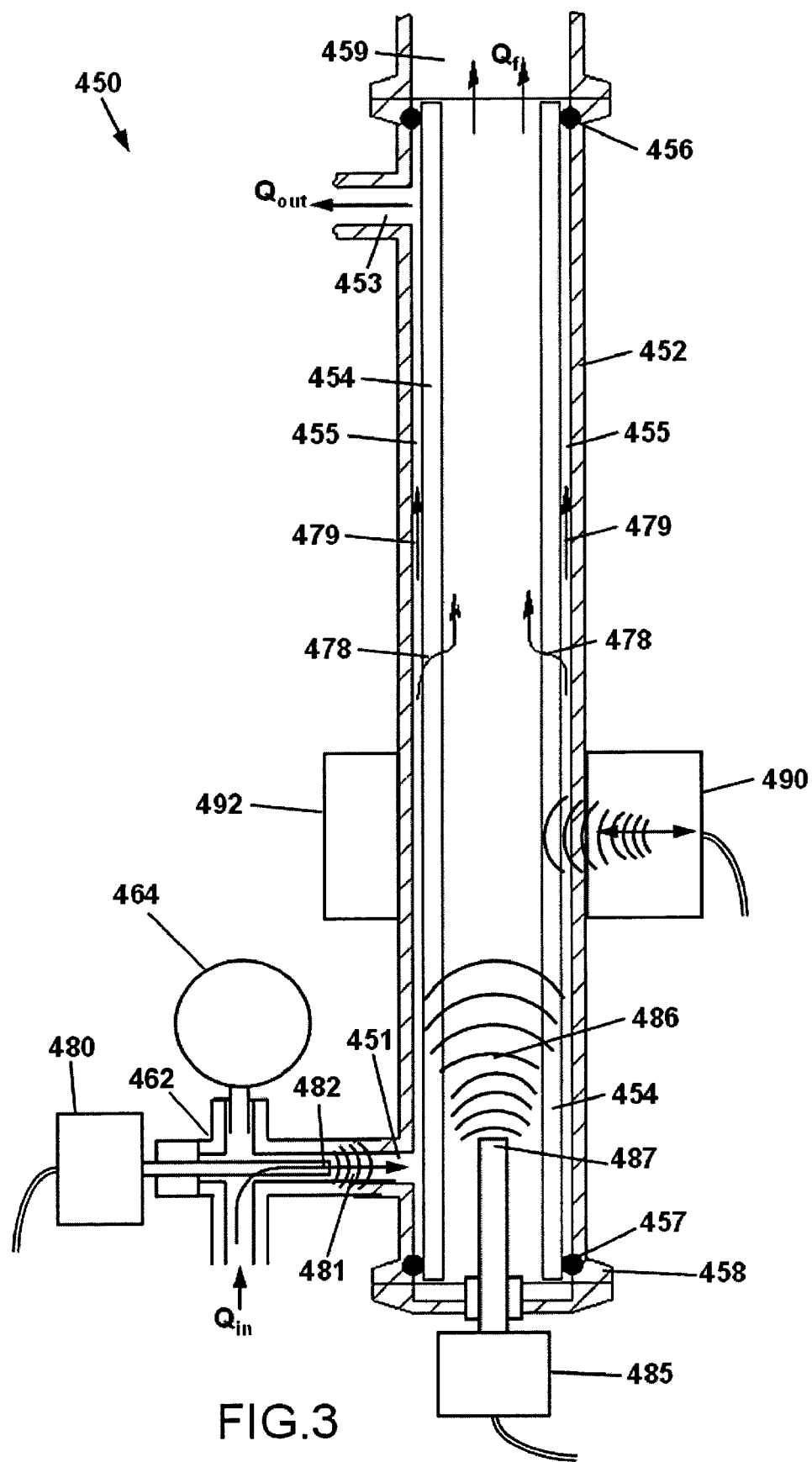
FIG. 3 is a side cross-sectional view of one preferred cross flow filter for use in the process of FIG. 2.

FIG. 3 is a side cross-sectional view of one preferred cross flow filter for use in the process of FIG. 2. Referring to FIG. 3, and in the preferred embodiment depicted therein, cross flow filter 450 comprises a tubular housing 452, and a tubular filter medium 454 that is substantially coaxial with housing 452, and that is secured within housing 452 by suitable means, such as e.g. an interference fit with elastomeric O-rings 456 and 457. In operation, slurry feedstock enters filter housing 452 though inlet port 451 at a flow rate of $Q_{in}$ and flows axially within housing 452 along the surface of filter medium 454 as indicated by arrows 479. Decantate slurry exits filter housing 452 through exit port 453 at a flow rate of $Q_{out}$, while the filtrate containing the halloysite microtubules permeates through filter medium 454 as indicated by arrows 478, and exits filter housing 452 through outlet 459 at a flow rate of $Q_f = Q_{in} - Q_{out}$.

Referring again to FIG. 3, filter 450 is provided with a sonicator 480 that provides ultrasonic energy 481 into the slurry feedstock in close proximity to the filter medium 454. In one preferred embodiment, sonicator 480 is fitted to a tee or a cross 462 such that the tip 482 that discharges the ultrasonic energy extends into inlet port 451 of filter housing 452. The remaining branch of cross 462 may be fitted with a pressure gauge 464 or other instrument or sensor.

In operation, the ultrasonic energy 481 from sonicator 480 causes the breakdown of large particles of halloysite in the slurry into smaller particles, and the spalling of microtubules and platelets from such particles. The microtubules pass through the filter medium 454 in the filtrate, while large particles are excluded by such filter medium, and are swept from the surface thereof, entrained in the decantate slurry, and discharged from outlet 453 in housing 452. The gap 455 between filter housing 452 and filter medium 454 is provided in sufficient width so as to allow the free passage of such entrained large particles therein.

In a further embodiment, filter 450 is provided with a second sonicator 485 secured to filter housing 452 at the base 458 thereof. The tip 487 of sonicator discharges ultrasonic energy 486 inside of the tubular filter medium 454, facilitating the passage of microparticles therethrough. In a further embodiments (not shown), filter 450 is provided with a plurality of sonicators disposed axially along and/or radially around filter housing 452 in a manner similar to that for sonicator 480. Such an arrangement provides a high flux of sonic energy into the slurry flowing along filter medium 454, thereby providing a more effective breakup of the agglomerates into individual microtubules.

Filter 450 may also be provided with a vibration source to assist the spalling of microparticles in the feed slurry. Referring again to FIG. 3, and in one preferred embodiment, vibrator 490 is secured to housing 452 by a bracket or pillow block 492. Vibrator 490 may be electrically operated, or pneumatically operated as shown in FIG. 2. In operation, vibrator 490 imparts vibrational energy 491 to housing 452, the slurry flowing in gap 455, and filter medium 454 and filtrate passing therethrough.

The filter medium 454 of filter 450 is a suitable medium which allows the passage of microtubules therethrough, and optionally, the passage of halloysite platelets therethrough, but which prevents the passage of larger particles. As recited in United States published application 2004/0173531A1 of Hammond, such filter medium may be formed of sintered metal, or porous ceramic. Alternatively, such filter medium may be formed from a layer of fine mesh woven screen, or a finely perforated electroformed screen, or concentric layers of these screens.

In another embodiment, the halloysite microtubules and platelets are first coated with a magnetic material such as iron or nickel, or the alloys nickel-boron, nickel-phosphorous, nickel-iron-phosphorous, and cobalt-boron as is disclosed at column 18, lines 38-41 of the aforementioned U.S. Pat. No. 5,492,696 of Price et al. The slurry of magnetically coated platelets and tubules are then delivered through a cross-flow filter comprising a porous tubular medium consisting essentially of a magnetic material, or a cross-flow filter comprising a housing, a porous tubular medium consisting essentially of a ferromagnetic material, and a wire coil wound around the exterior surface of the filter housing, wherein the wire coil comprises a first lead and a second lead attached to a power supply as disclosed in the aforementioned United States published application 2004/0173531A1 of Hammond. Such an electromagnetically operated cross-flow filter may be used to selectively pass magnetic particles of varying sizes.

Referring again to FIGS. 1 and 2, additional processes 430, 600, and 800 may be performed to further classify and/or purify the halloysite tubules contained in the filtrate of process 401. Such processes may include another filtration and/or dewatering process such as e.g., by a centrifuge, a filter press, or a tube press; a separation and classification process such as e.g. froth flotation, or electrophoresis; and/or a drying process.

Novel Structures Comprised of Nanotubules

As was stated previously, the purified halloysite microtubules or nanotubules that are prepared from the processes of the present invention may be filed with an active agent and used for a beneficial purpose, as is disclosed in U.S. Pat. Nos. 5,651,976, 5,705,191, and 6,401,816 of Price et al. In another aspect of the present invention, there is provided novel structures that include nanotubules of halloysite clay or other nanotubules.

Figure 4:
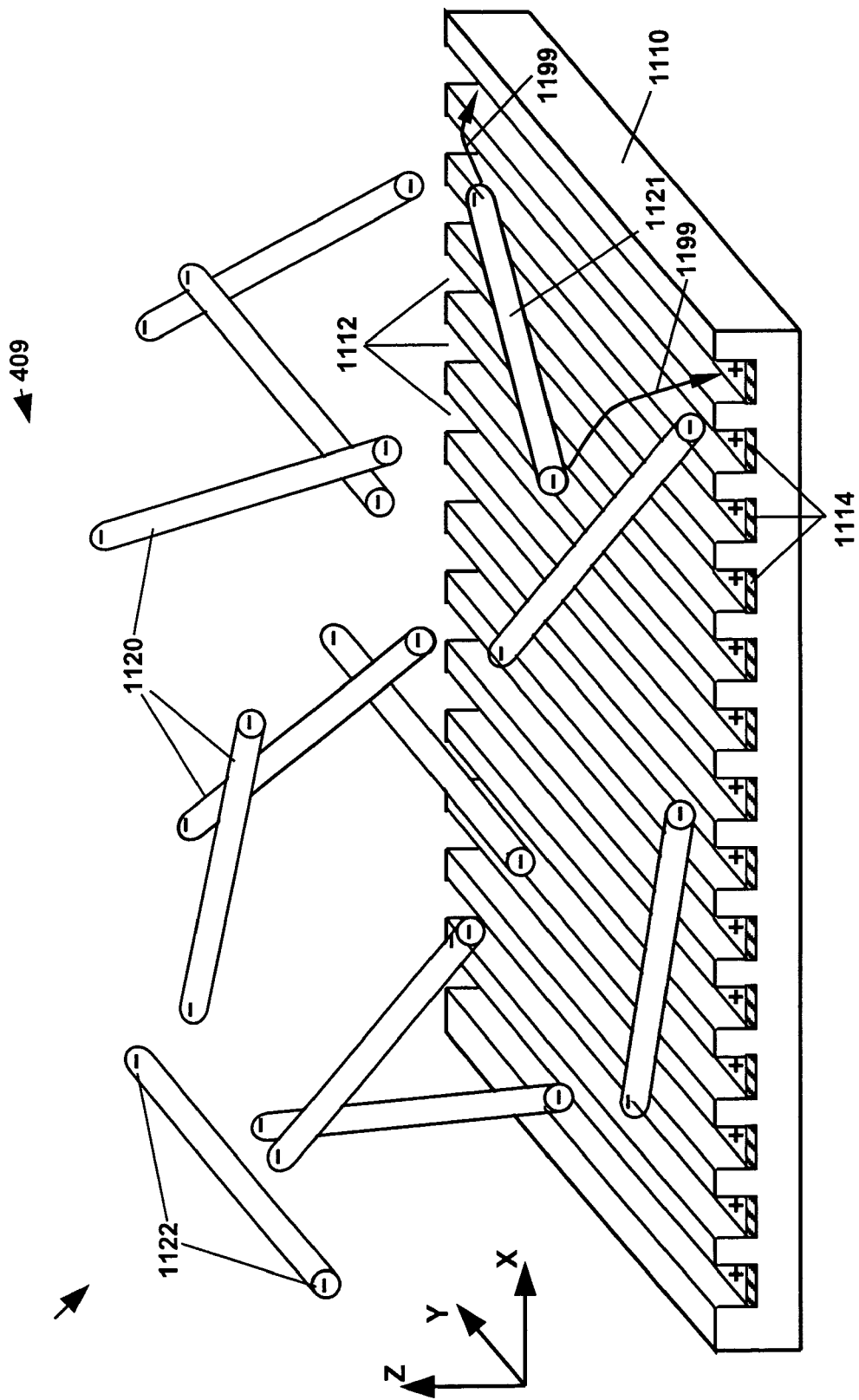
FIG. 4 is a perspective view of halloysite nanotubules suspended in a fluidized state proximate to a substrate comprising microchannels.

FIG. 4 is a perspective view of halloysite nanotubules suspended in a fluidized state proximate to a substrate comprising microchannels. Referring to FIG. 4, there is provided a substrate 1110, a portion of which is depicted therein. Substrate 1110 comprises an array of microchannels 1112, with metal pads 1114 or other conductive pads 1114 formed at the bottoms thereof at opposite ends and/or intermittently along microchannels 1112. The microchannelled structure of substrate 1110 may be fabricated by known microfabrication processes such as those used in the fabrication of integrated circuit chips, microelectromechanical devices, inkjet print heads, and the like.

Conductive pads 1114 are operatively electrically connected to an array of microwires (not shown) in a manner similar to that of making electrical connections to semiconductor chip circuits. Conductive pads may thus be provided with an electrical charge on the surfaces thereof. In such circumstances, substrate 1110 may be "developed" with a slurry containing halloysite nanotubules 1120. Such tubules 1120 are provided in a state wherein the ends of the tubules 1120 have an electrical charge 1122 that is opposite of that of pads 1114, and preferably a negative charge as shown in FIG. 4. It is known that halloysite tubules can be made negatively charged at a pH greater than about 3, and in particular at a pH greater than about 6, as is disclosed in "Characterization of halloysite for use as a microtubular drug delivery system," Levis et al., *International Journal of Pharmaceutics* 243 (2002), page 129. Accordingly such tubules will undergo electrophoretic migration as indicated by tubule 1121 and arrows 1199, becoming aligned with and being deposited into channels 1112.

FIG. 5A is a perspective view of halloysite nanotubules deposited in the microchannels of the substrate of FIG. 4; and FIG. 5B is a side elevation view of a halloysite nanotubule deposited in a microchannel of the substrate of FIG. 5A, taken along the line 5B-5B of FIG. 5A. It can be seen that microchannels 1112 of substrate 1110 are filled with captured nanotubules 1123. In one embodiment, the microchannels 1112 are provided with a width and/or depth substantially larger than the diameter of the nanotubules, and a plurality of nanotubules 1125 may be deposited in a nanochannel as shown in FIG. 5C.

Figure 6:
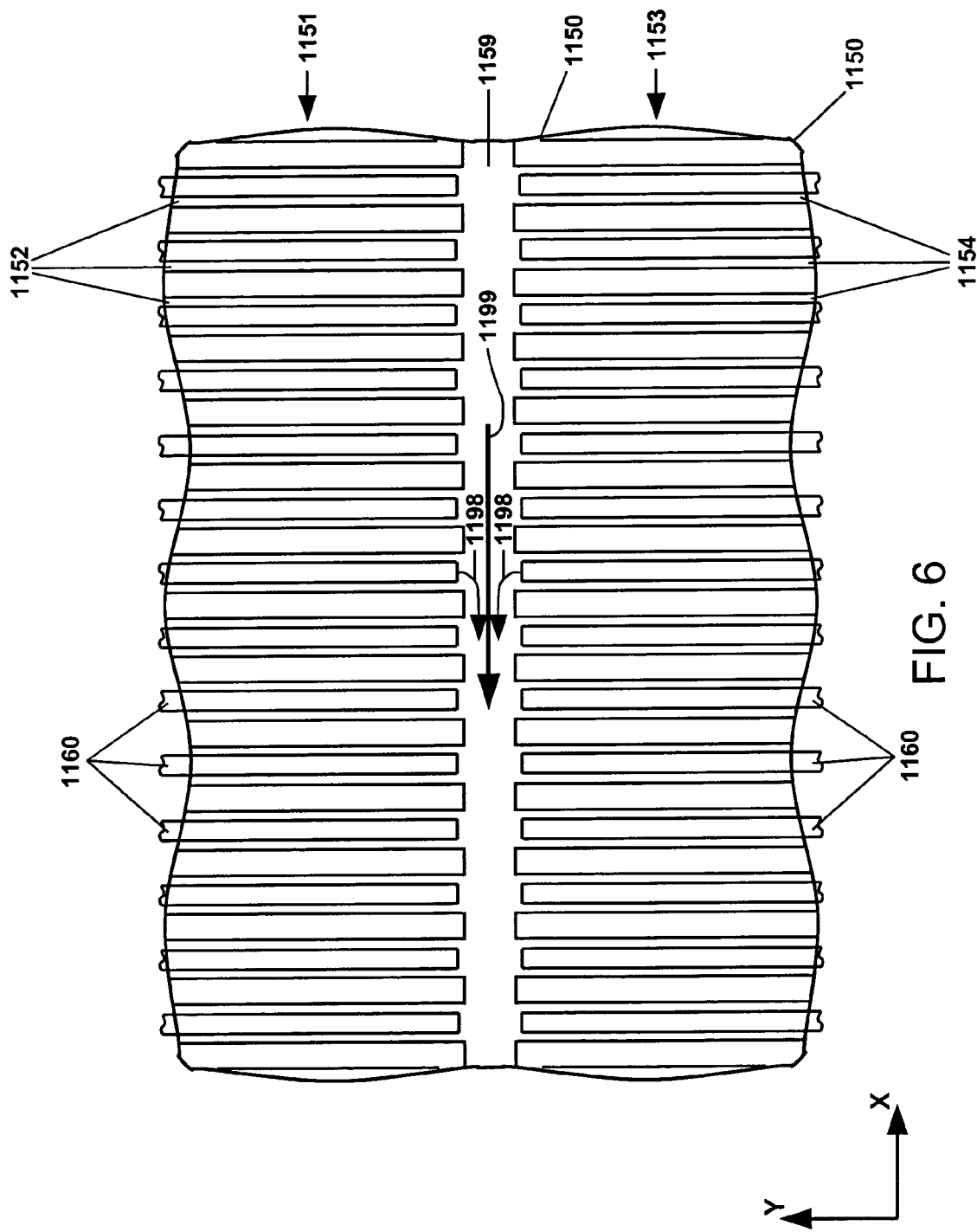
FIG. 6 is a top view of a microfluidic substrate comprising an array of microchannels containing nanotubules.

Such nanotubules contained in microchannels may be used for controlled delivery of reagents within a microfluidic structure. FIG. 6 is a top view of a microfluidic substrate comprising an array of microchannels containing nanotubules, said array of microchannels being orthogonal to a central microchannel. Referring to FIG. 6, substrate 1150 comprises a first channel array 1151 comprised of microchannels 1152, and second microchannel array 1153 comprised of microchannels 1154. Microchannel arrays 1151 and 1153 are filled with nanotubules 1160 as previously described with reference to FIGS. 4 and 5A-5C. Microchannel arrays 1151 and 1153 are also separated by a centrally located fluid channel 1159 therebetween.

In one preferred embodiment, nanotubules 1160 are filled with an active agent as disclosed in U.S. Pat. Nos. 5,651,976, 5,705,191, and 6,401,816 of Price et al. When a fluid is caused to flow through channel 1159 as indicated by arrow 1199, diffusion of such active agent occurs as indicated by arrows 1198 in a controlled manner into the fluid stream 1199. Thus the microfluidic structure may be used to deliver a reagent such as e.g. a drug within a small implantable substrate, and such structure may be included as a part of an implantable drug delivery system.

It will be apparent that many other equivalent structures may be used to achieve the same result, e.g. a single array of microchannels adjacent to a fluid channel, such microchannels being disposed in orientations other than orthogonal to such fluid channel. It will be further apparent that such halloysite nanotubules may contain a plurality of reagents, and may be arrayed in a manner such that a chemically reactive system is created on substrate 1150.

In one embodiment of the present invention, mineral microtubules such as halloysite microtubules may be used in an electrode structure of an electrochemical capacitor to improve the overall capacitance of the electrochemical capacitor. In the various embodiments of the present invention that are described in this specification, mineral microtubules are used to improve the charge storage capabilities of an ultracapacitor. The various embodiments of the present invention use both the electric double layer effect and pseudocapacitance as mechanisms for storing charge. The electric double layer effect is a phenomenon that occurs at the boundary of an electrode and the electrolyte of an electrochemical capacitor. The electric double layer effect results from the adsorption of ions on the charged electrode surface of a capacitor such as an electrochemical capacitor. The adsorption of ions close to the electrode surface forms what is known as the inner Helmholtz plane, the overall charge of which is a function of the extent of adsorption that takes place. In addition, solvated counter ions in the capacitor approach the charged surface up to the inner Helmholtz plane, forming the outer Helmholtz plane, and in turn shielding the surface charge. These two charge planes form what is known as the electric double layer. An electrochemical capacitor that exhibits the electric double layer effect is known as an ultracapacitor or a supercapacitor. As used herein, the term ultracapacitor is meant to include supercapacitors, pseudocapacitors, electrochemical capacitors, electrochemical double layer capacitors, double layer capacitors, hybrid capacitors, composite capacitors, and hybrid composite capacitors. In particular, the terms ultracapacitor and supercapacitor are frequently used interchangeably herein.

In addition to the electric double layer effect, the various embodiments of the present invention use a mechanism known as pseudocapacitance to increase the overall charge storage of an ultracapacitor. Pseudocapacitance occurs when ions adsorbed by the electrode structure or a component of the electrode structure (e.g., mineral microtubules) participate in surface redox reactions to store charge in ways similar to a battery.

To further increase charge storage in an ultracapacitor, mineral microtubules that are used as a component of an ultracapacitor electrode serve to increase the overall surface area of the electrode, thus increasing charge storage of the ultracapacitor.

Figure 7:
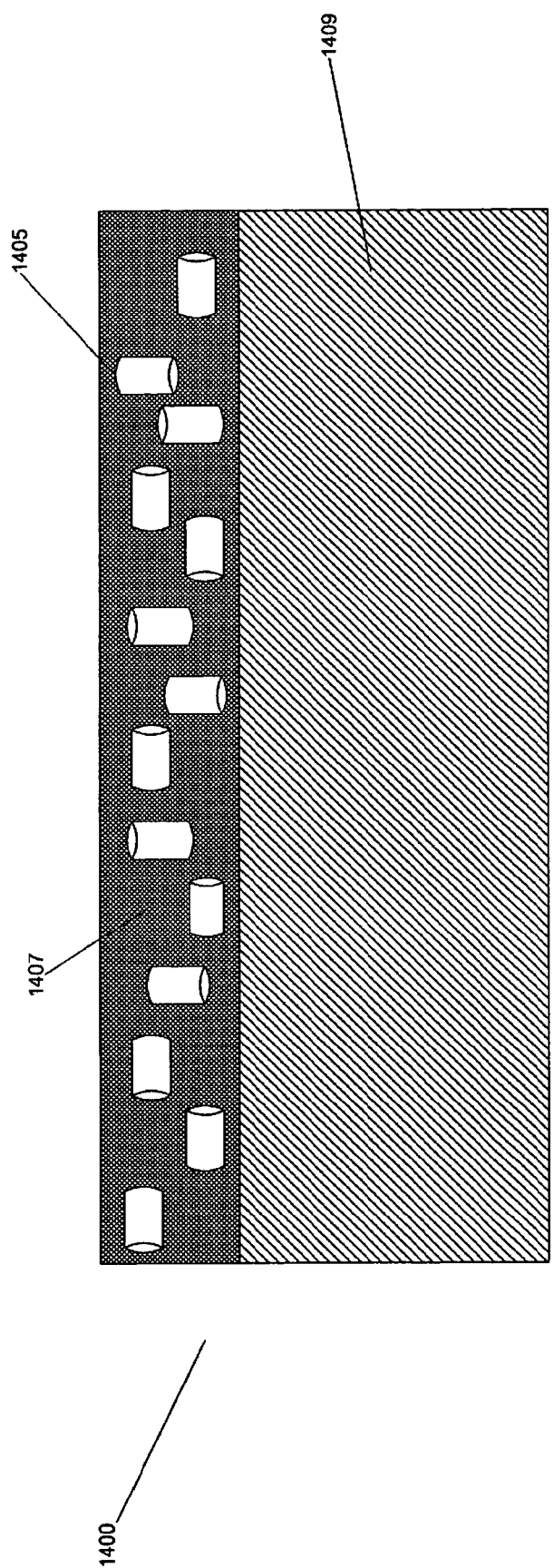
FIG. 7 is a side cross-sectional view of a distributed charge storage device structure comprising halloysite tubules.
Figure 8:
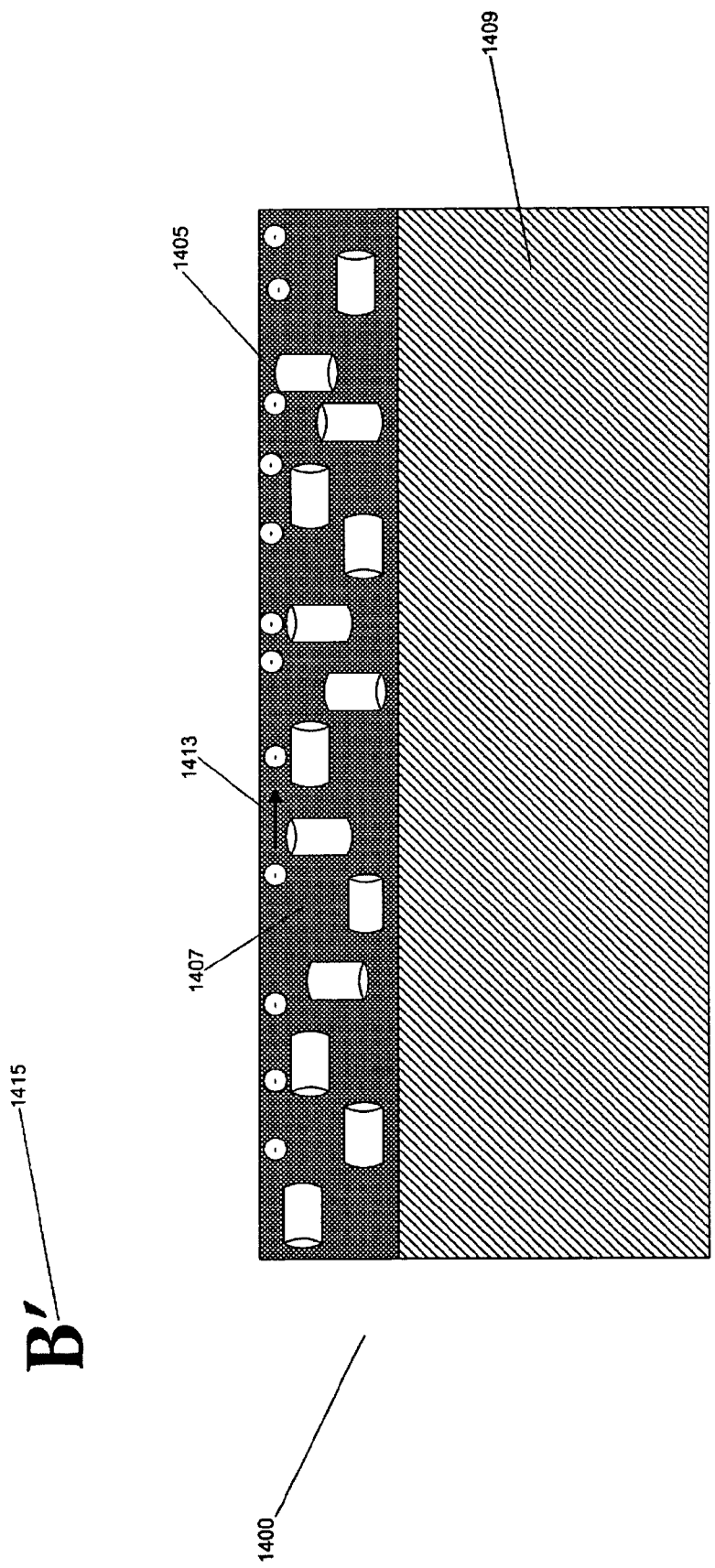
FIG. 8 shows the distributed charge storage device structure of FIG. 7 containing a substrate and a layer of conductive polymer with halloysite microtubules in the presence of a magnetic field at the moment that such magnetic field is applied.
Figure 9:
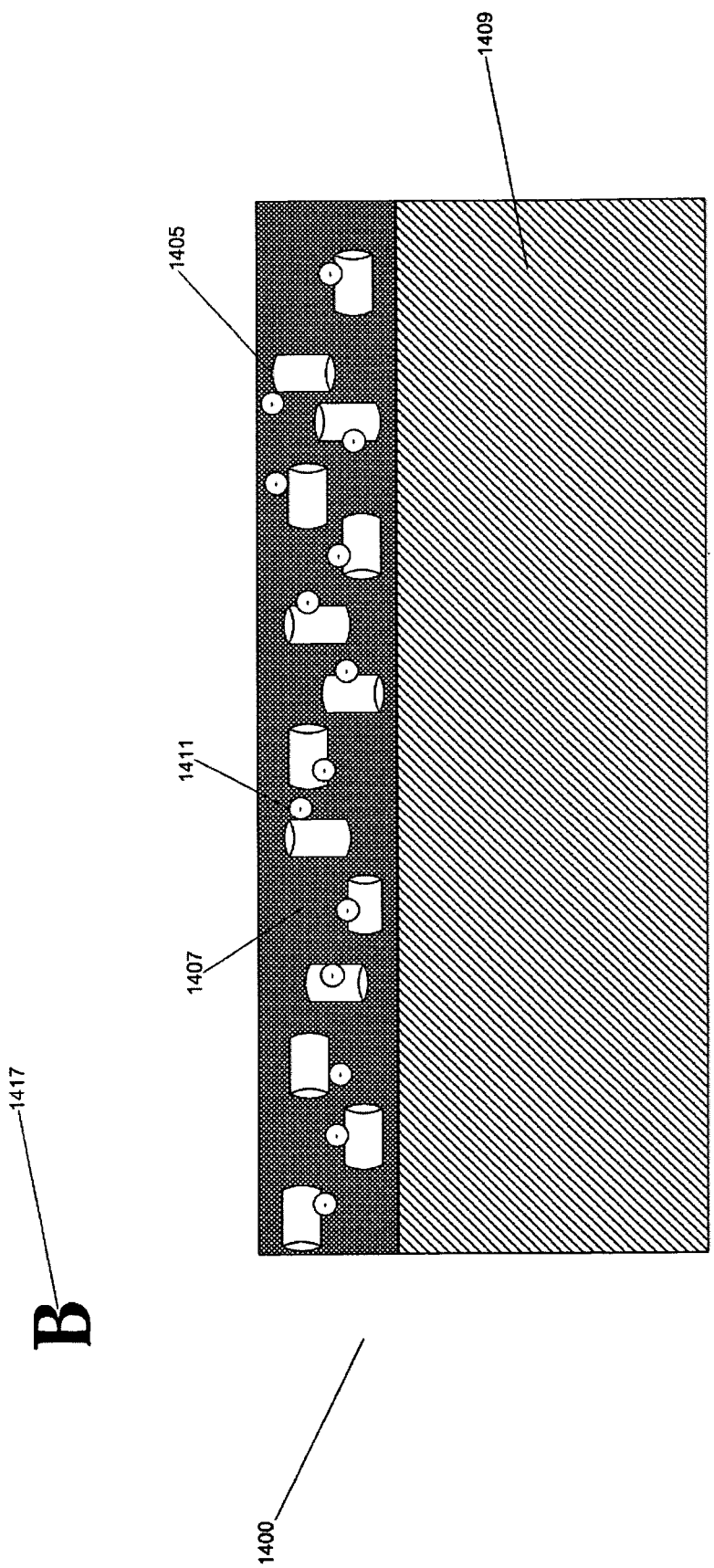
FIG. 9 shows the distributed charge storage device structure of FIG. 7 containing a substrate and a layer of conductive polymer with halloysite microtubules in the presence of a magnetic field at steady state conditions.

The ability to store charge within a component of a structure such as an electrode has been previously described in this specification by way of FIGS. 7, 8 and 9 wherein a distributed charge storage device comprised of halloysite microtubules is illustrated. The halloysite microtubules are contained in a conductive polymer layer that is deposited on a substrate. Such a structure forms the basis of an ultracapacitor electrode according to one embodiment of the present invention. The embedded halloysite microtubules of the structure 1400 shown in FIGS. 7, 8, and 9 serve to retain and capture electrical charge. In addition, it is believed that the embedded halloysite microtubules enhance the electric double layer effect by increasing the adsorption of ions close to the surface of the structure 1400 that is illustrated in FIGS. 7, 8 and 9. The ability to capture charge along the surface of an object proves beneficial in the reduction of eddy currents in applications such as electronic shielding and improved magnetic resonance imaging. It is believed by the applicants that the principles governing the operation of this charge storage device also apply to the electrode structure of an ultracapacitor, and will provide ultracapacitors with improved charge storage capabilities.

The applicants, not wishing to be bound by any particular theory, believe that the use of mineral microtubules improves the charge storage capabilities of any capacitive structure, whether due to the double layer effect, pseudocapacitance, or another physical, chemical or electrical property. Mineral microtubules, as used in this specification, include all mineral structures that are tubular or cylindrical in shape. Examples of mineral microtubules include halloysite microtubules, cylindrite microtubules, boulangerite microtubules, and imogolite microtubules.

As further illustrated by way of FIGS. 13-19, various embodiments of the present invention are described. The various embodiments of the present invention may include composite electrodes, which are electrodes made from more than one material, as well as hybrid electrodes, which are electrodes contained in a capacitive structure that are of different material compositions.

Figure 13:
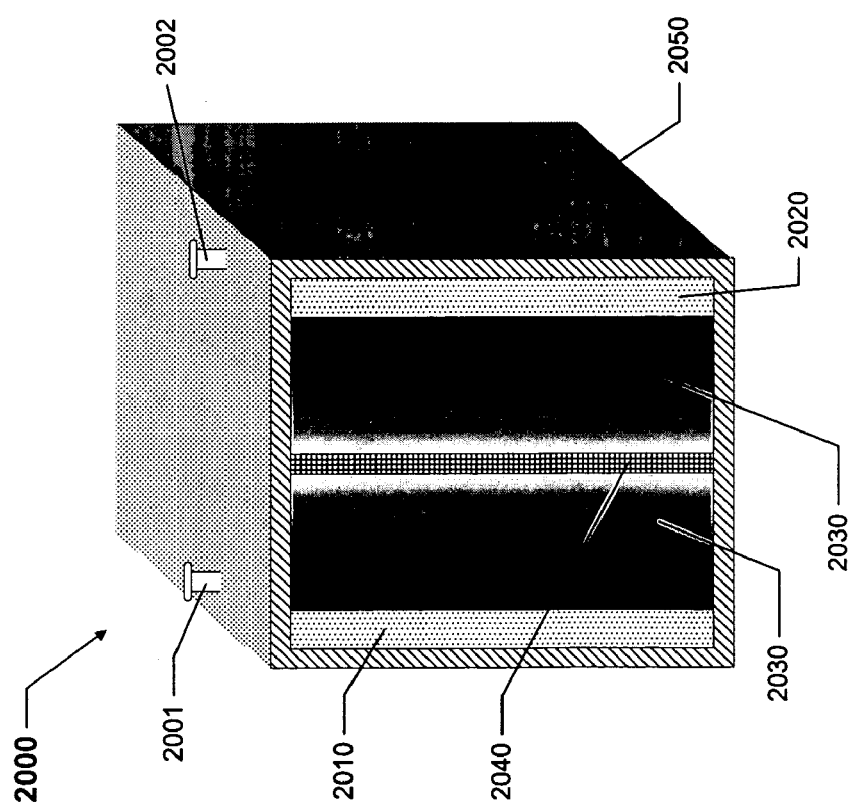
FIG. 13 is a cross sectional view of an ultracapacitor having electrodes containing mineral microtubules.

Referring now to FIG. 13, a cross sectional view of an ultracapacitor 2000 with electrodes containing microtubules is shown. The first electrode 2010 and the second electrode 2020 contain mineral microtubules. The mineral microtubules, in one embodiment of the present invention, have inner diameters ranging from about 200 angstroms to about 2000 angstroms, and have lengths ranging from about 0.1 micrometer to about 2.0 micrometers. The first electrode 2010 and the second electrode 2020, in one embodiment, are made from the same material. The mineral microtubules, in one embodiment of the present invention, are contained in a paste that is used in forming the first electrode 2010 and the second electrode 2020. An example of a paste electrode is found in U.S. Pat. No. 3,648,126, "Electrical Capacitor Employing Paste Electrodes" to Boos and Metcalfe, the entire disclosure of which is incorporated herein by reference.

In one embodiment of the present invention, a paste is made by mixing mineral microtubules with a sufficient amount of an aqueous solution of 25 percent by weight of KOH, or a similar electrolyte, to form a slurry. In the preferred embodiment, the same electrolyte is used both to form the slurry and as the electrolyte 2030 used in the construct of the ultracapacitor 2000. In some embodiments, activated carbon particles may be added to the slurry. A paste is then made by partially drying the slurry to remove some portion of the water, and filtering the slurry by conventional means such as e.g., centrifugation, to remove the excess electrolyte. The paste is then placed in a die and compressed to a pressure of about 400 psi. The electrolyte paste may then be placed in the shell 2050 to form the first electrode 2010 and the second electrode 2020. The electrode paste may be placed directly onto the shell 2050, or in some embodiments, may be placed on a support substrate (not shown) by thick film screen printing, spraying, roll coating or direct writing by an apparatus such as is disclosed in U.S. Pat. No. 4,485,387, "Inking system for producing circuit patterns," of Drumheller, the disclosure of which is incorporated herein by reference. The support substrate may, in some embodiments, be a metal foil.

In another embodiment of the present invention, the first electrode 2010 and the second electrode 2020 are made from a mixture of mineral microtubules and a conductive polymer. In one preferred embodiment of the present invention, the mineral microtubules are dispersed throughout the conductive polymer polypyrrole, and this composite material is used to form the first electrode 2010 and the second electrode 2020. In another embodiment of the present invention, the mineral microtubules are coated with a conductive polymer such as polypyrrole and further embedded or encapsulated in an electrode assembly. A technique to form and coat objects with conductive polymers is disclosed in U.S. Pat. No. 5,827,186 entitled "Method and PDT Probe for Minimizing CT and MRI Image Artifacts", the entire disclosure of which is incorporated herein by reference.

In another embodiment of the present invention, mineral microtubules are added to carbon aerogel to form an electrode. The use of carbon aerogels to form ultracapacitor electrodes is disclosed in U.S. Pat. No. 6,704,192, the entire disclosure of which is incorporated herein by reference.

The first electrode 2010 and the second electrode 2020 may, in one embodiment of the present invention, be about 5-10 cm. in height, about 5-10 cm. long and about 1 cm. thick. In other embodiments, the first electrode 2010 and the second electrode 2020 are formed as relatively thin films on the order of about 0.05 to about 1 mm. thick.

Referring again to FIG. 13, an electrolyte 2030 is placed between the first electrode 2010 and the second electrode 2020. The electrolyte 2030 should be non-detrimental to the first electrode 2010 and the second electrode 2020 and be non-corrosive to said electrodes. The electrolyte 2030 may, in some embodiments, be an aqueous solution of a salt or a base such as potassium hydroxide, sodium hydroxide, sodium chloride, ammonium chloride, calcium chloride, potassium bromide, potassium carbonate, and the like. Non-aqueous solutions may also be used as the electrolyte 2030. Organic solvents such as sulfonates, sulfoxides, amides, pyrrolidones, organic nitrites, and carbonates such as propylene carbonate may be used as suitable solvents containing metal salts of organic and inorganic acids, ammonium and quaternary ammonium salts, and the like. The electrolyte serves as a source of ions and ion conductivity.

To prevent electrical shorting of the first electrode 2010 and the second electrode 2020 through the electrolyte 2030, a separator 2040 is used. The separator 2040 is placed between the electrolyte 2030 and is generally made from a porous material that allows the ions in the electrolyte 2030 to freely move, yet acts as an electrical insulator. Porous materials that may be used as the separator 2040 include porous polyvinyl chloride, fiberglass, paper, cellulose esters, polymers, ceramic fibers, and cellulose acetate. In some embodiments of the present invention, the separator 2040 may be a non-porous ion conducting film or ion exchange membrane. To facilitate the proper ion exchange in the supercapacitor 2000, the separator 2040 may be soaked with electrolyte prior to assembly.

Referring again to FIG. 13, a casing 2050 is shown surrounding the first electrode 2010, the second electrode 2020, the electrolyte 2030 and the separator 2040. The casing 2050 may, in some embodiments, include gaskets, baffles, trusses, pins, or other mechanical structures used to increase the mechanical strength and integrity of the supercapacitor 2000. The casing 2050 may be made from a plastic such as polyvinyl chloride, polypropylene, vinyl, and the like. The casing 2050, in other embodiments, may be made from a metal such as steel, aluminum or brass, and may, in some embodiments, contain an electrically insulating envelope to prevent short circuits within the ultracapacitor 2000.

Contact terminals 2001 and 2002, which are electrically connected to electrodes 2010 and 2020 respectively, extend through casing 2050. Terminals 2001 and 2002 are sealed and/or insulated from electrical contact with casing 2050 or any conductive portion thereof. In use, contact terminals 2001 and 2002 are electrically connected to a source of electrical energy (not shown), such that electrical energy may be temporarily stored in ultracapacitor, and subsequently discharged and used as required. The source of electrical energy may be e.g., a battery, a photovoltaic cell, a fuel cell, an alternating current (AC) voltage source with a direct current (DC) converter, and pluralities of combinations thereof.

In one embodiment, casing 2050 may be formed of a glass or other suitable light transmissive material, and electrodes 2010 and 2020 may further comprise a photoconductive material, such that the rate of discharge of ultracapacitor 2000 may be regulated by exposure thereof to light directed through the walls of casing 2050. Suitable photoconductive materials include chalcogenide glasses such as amorphous selenium, and organic photoconductors such as titanyl or vanadyl phthalocyanine, benzamidazole perylene and the like. Other suitable photoconductors are known; see, for example, U.S. Pat. No. 5,654,117, "Process for preparing an electrophotographic imaging member," of Nealey, et al., the disclosure of which is incorporated herein by reference.

The particular source of light is chosen depending upon the photoconductor used in ultracapacitor 2000. For example, the photoconductor trigonal selenium is responsive to a broad spectrum of visible light, while phthalocyanine pigments are responsive generally to infrared light having a wavelength of about 800 nanometers. In operation, the ultracapacitor 2000 may be charged in darkness, and in order to effect or accelerate the discharge thereof, light is directed through a transparent casing and is absorbed by electrodes 2010 and 2020. The photoconductive material therein becomes conductive upon such absorption, resulting in an increased conductivity of electrodes 2010 and 2020, or at least some portion thereof proximate to their surfaces, resulting in the triggering of or increase in the rate of discharge of ultracapacitor 2000.

In one embodiment, the mineral tubules, preferably halloysite tubules are provided with a thin film coating of photoconductive material such as selenium, a phthalocyanine, or a perylene. Such thin film photoconductive coating may be deposited preferably by a vacuum coating process.

The size of casing 2050 and ultracapacitor 2000 will vary widely, depending upon the energy storage requirements of the particular application. For example, in some embodiments involving small commercial lighting displays illuminated by ultrabright light emitting diodes, casing 2050 may be rectangular shaped, or cube shaped with a characteristic edge dimension on the order of about 5 centimeters.

Figure 14:
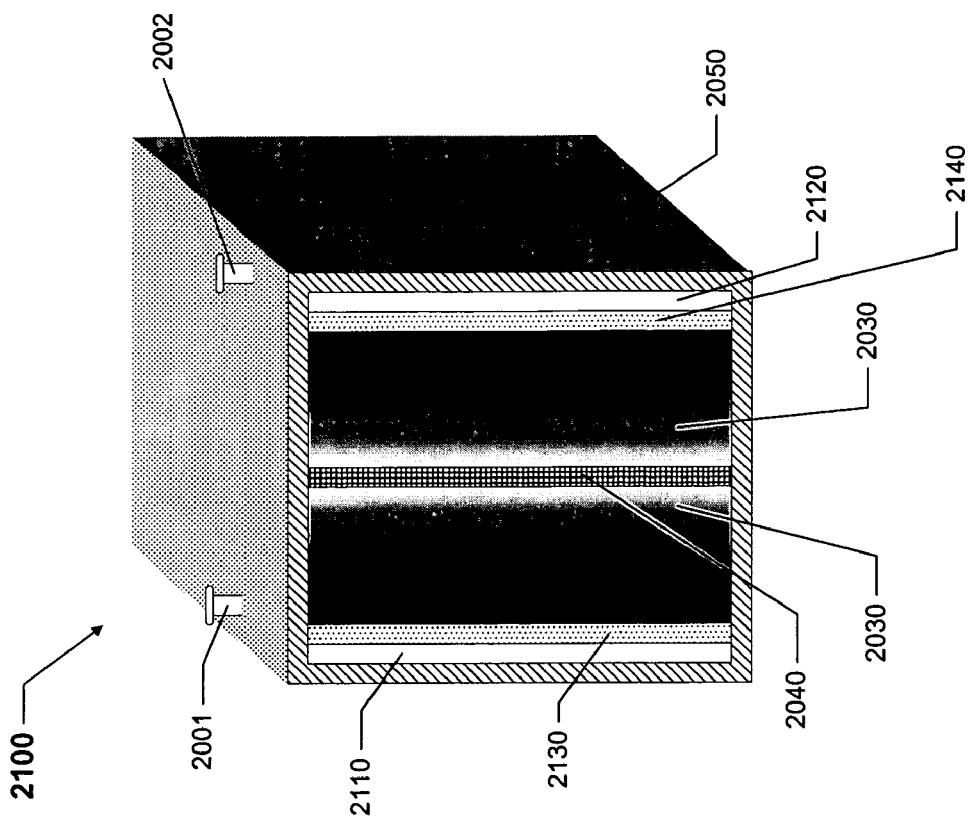
FIG. 14 is a cross sectional view of an ultracapacitor having composite electrodes with a mineral microtubule based coating.

Referring now to FIG. 14, an ultracapacitor 2100 with composite electrodes is shown. The first base electrode 2110 and the second base electrode 2120 are made from a material such as carbon, activated carbon, or carbon aerogels. In some embodiments of the present invention, a pseudocapacitance material such as ruthenium oxide or manganese oxide is used for the first base electrode 2110 and the second base electrode 2120. Pseudocapacitance refers to reversible faradaic reactions occurring at a solid surface over a defined potential range, and occurs when ions absorbed on the electrode or at a component of the electrode also participate in surface redox reactions. In other embodiments of the present invention, the first base electrode 2110 and the second base electrode 2120 are made from a conductive polymer such as polypyrrole. Deposited on the first base electrode 2110 is a first electrode coating 2130. The first electrode coating 2130 may, in some embodiments of the present invention, be a paste of mineral microtubules, an electrolyte, and in some embodiments, carbon particles, using the process described herein to make the paste electrodes of FIG. 13. The paste material that is used as the first electrode coating 2130 may be applied to the first base electrode 2110 by thick film screen printing, spraying, rolling, dip coating, direct writing, or painting. In a similar way, the second base electrode 2120 receives a second electrode coating 2130. The second electrode coating 2140 may, in some embodiments of the present invention, be a paste of mineral microtubules, an electrolyte, and in some embodiments, carbon particles, using the process described herein to make the paste electrodes of FIG. 13. The paste material that is used as the second electrode coating 2140 may also be applied to the second base electrode 2120 by thick film screen printing, spraying, rolling, dip coating, direct writing, or painting.

In another embodiment of the present invention, the first electrode coating 2130 and the second electrode coating 2140 are made from a mixture or composite comprised of mineral microtubules and a conductive polymer. In one embodiment of the present invention, the mineral microtubules are dispersed throughout the polypyrrole polymer, and this composite material is used to form the first electrode coating 2130 and the second electrode coating 2140 as described previously in this specification. Conductive polymers and mixtures containing conductive polymers and mineral microtubules may be applied through dip coating, spray coating, roll coating, hot melt or solvent extrusion coating, and other suitable polymer coating techniques, depending upon the configuration of the electrodes.

Referring again to FIG. 14, an electrolyte 2030 is placed between the first electrode coating 2130 and the second electrode coating 2140. The electrolyte 2030 should be non-detrimental to the first electrode coating 2130 and the second electrode coating 2140 and be non-corrosive to said electrodes. The electrolyte 2030 may, in some embodiments, be an aqueous solution of a salt or a base such as potassium hydroxide, sodium hydroxide, sodium chloride, ammonium chloride, calcium chloride, potassium bromide, potassium carbonate, and the like. Non-aqueous solutions may also be used as the electrolyte 2030. Organic solvents such as sulfonates, sulfoxides, amides, pyrrolidones, organic nitrites, and carbonates such as propylene carbonate may be used as suitable solvents containing metal salts of organic and inorganic acids, ammonium and quaternary ammonium salts, and the like. The electrolyte serves as a source of ions and ion conductivity.

To prevent electrical shorting of the first electrode coating 2130 and the second electrode coating 2140 through the electrolyte 2030, a separator 2040 is used. The separator 2040 is placed between the electrolyte 2030 and is generally made from a porous material that allows the ions in the electrolyte 2030 to freely move, yet acts as an electrical insulator. Porous materials that may be used as the separator 2040 include porous polyvinyl chloride, fiberglass, paper, cellulose esters, polymers, ceramic fibers, and cellulose acetate. In some embodiments of the present invention, the separator 2040 may be a non-porous ion conducting film or ion exchange membrane. To facilitate the proper ion exchange in the supercapacitor 2100, the separator 2040 may be soaked with electrolyte prior to assembly.

Referring again to FIG. 14, a casing 2050 is shown surrounding the components of the ultracapacitor. The casing 2050 may, in some embodiments, include gaskets, baffles, trusses, pins, or other mechanical structures used to increase the mechanical strength and integrity of the supercapacitor 2100. The casing 2050 may be made from a plastic such as polyvinyl chloride, polypropylene, vinyl, and the like. The casing 2050, in other embodiments, may be made from a metal such as steel, aluminum or brass, and may, in some embodiments, contain an electrically insulating envelope to prevent short circuits within the ultracapacitor 2100.

Contact terminals 2001 and 2002, which are electrically connected to first base electrode 2010 and second base electrode 2020 respectively, extend through casing 2050. Terminals 2001 and 2002 are sealed and/or insulated from electrical contact with casing 2050 or any conductive portion thereof. In use, contact terminals 2001 and 2002 are electrically connected to a source of electrical energy (not shown), as described previously in this specification.

In one embodiment, casing 2050 may be formed of a glass or other suitable light transmissive material, and first and second base electrodes 2110 and 2120 may further comprise a photoconductive material, such that the rate of discharge of ultracapacitor 2100 may be regulated by exposure thereof to light directed through the walls of casing 2050, as described previously in this specification.

Referring now to FIG. 15, an ultracapacitor 2200 with hybrid composite electrodes is shown. The first base electrode 2110 is made from a material such as carbon, activated carbon, or carbon aerogels. In some embodiments of the present invention, a pseudocapacitance material such as ruthenium oxide or manganese oxide is used for the first base electrode 2110. In other embodiments of the present invention, the first base electrode 2110 is made from a conductive polymer such as polypyrrole. Deposited on the first base electrode 2110 is a first electrode coating 2130. The first electrode coating 2130 may, in some embodiments of the present invention, be a paste of mineral microtubules, an electrolyte, and in some embodiments, carbon particles, using the process described herein to make the paste electrodes of FIG. 13. The paste material that is used as the first electrode coating 2130 may be applied to the first base electrode 2110 by thick film screen printing, spraying, rolling, dip coating, direct writing, or painting.

In another embodiment of the present invention, the first electrode coating 2130 is made from a mixture of mineral microtubules and a conductive polymer. In one embodiment of the present invention, the mineral microtubules are dispersed throughout the polypyrrole polymer, and this composite material is used to form the first electrode coating 2130, as described previously in this specification.

The conventional second electrode 2210 is made from a material such as carbon, activated carbon, or carbon aerogels. In some embodiments of the present invention, a pseudocapacitance material such as ruthenium oxide or manganese oxide is used for the conventional second electrode 2210. In other embodiments of the present invention, the conventional second electrode 2210 is made from a conductive polymer such as polypyrrole.

Referring again to FIG. 15, an electrolyte 2030 is placed between the first electrode coating 2130 and the conventional second electrode 2210. The electrolyte 2030 should be non-detrimental to the first electrode coating 2130 and the conventional second electrode 2210 and be non-corrosive to said electrodes. The electrolyte 2030 may, in some embodiments, be an aqueous solution of a salt or a base such as potassium hydroxide, sodium hydroxide, sodium chloride, ammonium chloride, calcium chloride, potassium bromide, potassium carbonate, and the like. Non-aqueous solutions may also be used as the electrolyte 2030. Organic solvents such as sulfonates, sulfoxides, amides, pyrrolidones, organic nitrites, and carbonates such as propylene carbonate may be used as suitable solvents containing metal salts of organic and inorganic acids, ammonium and quaternary ammonium salts, and the like. The electrolyte serves as a source of ions and ion conductivity.

To prevent electrical shorting of the first electrode coating 2130 and the conventional second electrode 2210 through the electrolyte 2030, a separator 2040 is used. The separator 2040 is placed between the electrolyte 2030 and is generally made from a porous material that allows the ions in the electrolyte 2030 to freely move, yet acts as an electrical insulator. Porous materials that may be used as the separator 2040 include porous polyvinyl chloride, fiberglass, paper, cellulose esters, polymers, ceramic fibers, and cellulose acetate. In some embodiments of the present invention, the separator 2040 may be a non-porous ion conducting film or ion exchange membrane. To facilitate the proper ion exchange in the supercapacitor 2200, the separator 2040 may be soaked with electrolyte prior to assembly.

Referring again to FIG. 15, a casing 2050 is shown surrounding the components of the ultracapacitor. The casing 2050 may, in some embodiments, include gaskets, baffles, trusses, pins, or other mechanical structures used to increase the mechanical strength and integrity of the supercapacitor 2200. The casing 2050 may be made from a plastic such as polyvinyl chloride, polypropylene, vinyl, and the like. The casing 2050, in other embodiments, may be made from a metal such as steel, aluminum or brass, and may, in some embodiments, contain an electrically insulating envelope to prevent short circuits within the ultracapacitor 2200.

Contact terminals 2001 and 2002, which are electrically connected to first base electrode 2010 and conventional second electrode 2210 respectively, extend through casing 2050. Terminals 2001 and 2002 are sealed and/or insulated from electrical contact with casing 2050 or any conductive portion thereof. In use, contact terminals 2001 and 2002 are electrically connected to a source of electrical energy (not shown), as described previously in this specification.

In one embodiment, casing 2050 may be formed of a glass or other suitable light transmissive material, and first base electrodes 2110 may further comprise a photoconductive material, such that the rate of discharge of ultracapacitor 2100 may be regulated by exposure thereof to light directed through the walls of casing 2050, as described previously in this specification.

Referring now to FIG. 16, an ultracapacitor 2300 with hybrid electrodes is shown. The ultracapacitor 2300 comprises a first electrode 2010 containing mineral microtubules and a conventional second electrode 2210, each of which has been previously described in this specification. The ultracapacitor 2300 further comprises an electrolyte 2030, a separator 2040, contact terminals 2001 and 2002, and a case 2050 that have been previously described in this specification.

Figures 17, 18:
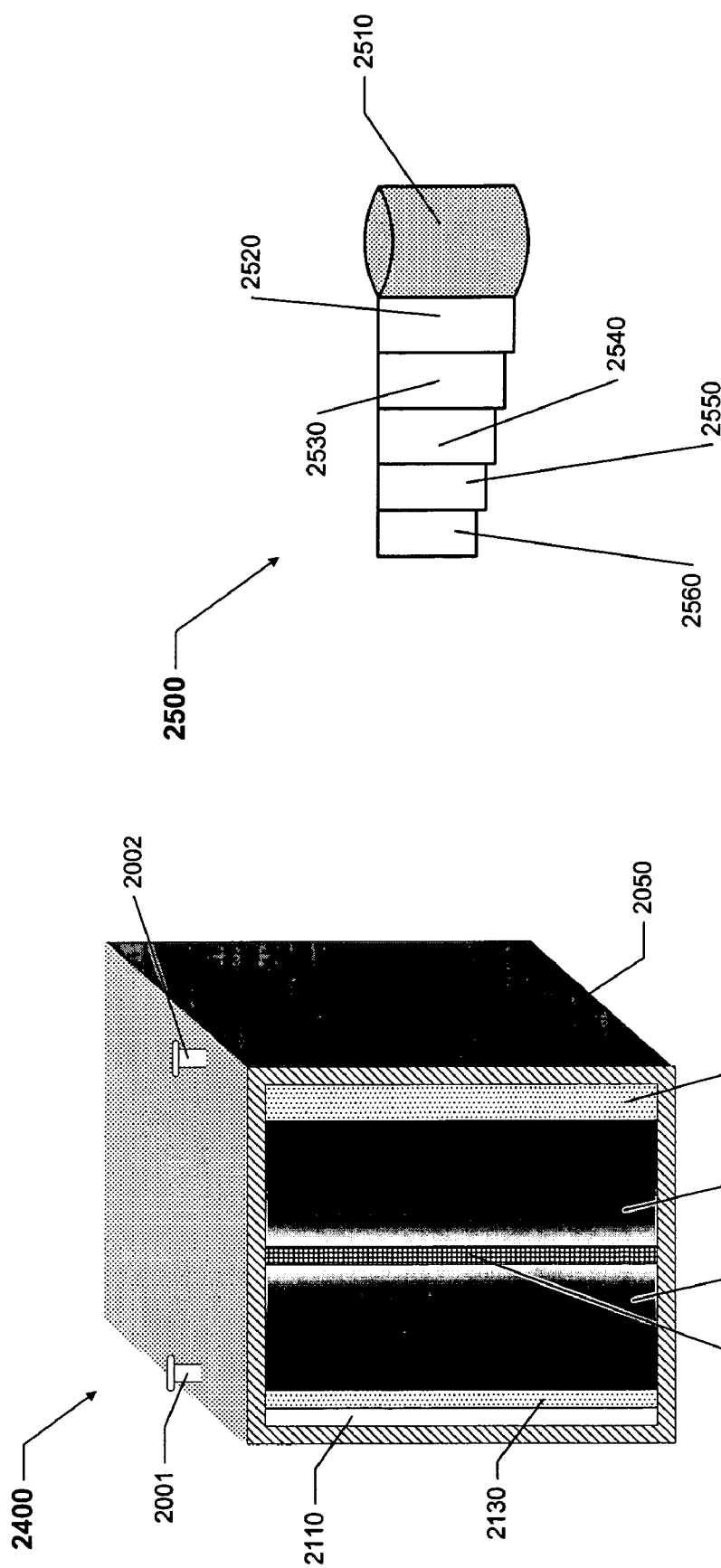
FIG. 17 is a cross sectional view of an ultracapacitor having a hybrid electrode configuration wherein one electrode contains mineral microtubules and one electrode is a composite electrode with a mineral microtubule coating.
FIG. 18 depicts a wound ultracapacitor that has been partially unwound to show the layers comprising such ultracapacitor.

FIG. 17 illustrates another embodiment of the present invention, an ultracapacitor 2400 with hybrid composite electrodes 2110 and 2020, each of which contains mineral microtubules. The ultracapacitor 2400 comprises a first base electrode 2110, a first electrode coating 2130, and a second electrode 2020. Each of these electrode structures has been previously described in this specification. The ultracapacitor 2400 further comprises an electrolyte 2030, a separator 2040, contact terminals 2001 and 2002, and a case 2050 that have been previously described in this specification.

In some embodiments of the present invention, the electrode, electrolyte and separator of the ultracapacitor may be arrayed in layers, as illustrated by way of FIGS. 13-17. Such a configuration provides an increase in the overall capacitive surface area and thus a further increase capacitance. In a further embodiment, the structures described herein and shown in FIGS. 13-17 may be wound in a scroll-like structure, as is more clearly shown in FIG. 18. In FIG. 18, the various components of the ultracapacitor 2500 are shown partially unrolled for clarity. 2510 is a cylindrical casing that may be made from a plastic, metal, or the like. The ultracapacitor 2500 contains a first wound electrode 2520, a first wound electrolyte 2530, a wound separator 2540, a second wound electrolyte 2550, and a second wound electrode 2560.

Figure 19:
FIG. 19 is a cross sectional image of halloysite microtubules.

Referring now to FIG. 19, a photographic magnified end view of various halloysite microtubules 2600 is provided. The halloysite microtubules 2600 may be substantially cylindrical microtubules 2610, or may be rolled scroll-like cylinders 2620. The halloysite microtubules, and mineral microtubules in general, may be processed as previously described in this specification. Additionally, in some embodiments of the present invention, mineral microtubules may be filled with carbon, activated carbon, semiconductor materials, dielectric materials, or magnetoresistive materials, prior to being used in ultracapacitor electrodes. The process of filling mineral microtubules, and in particular, halloysite microtubules, is known in the art. Reference may be had to U.S. Pat. No. 5,651,976 "Controlled Release of Active Agents Using Inorganic Tubules" to Price and Gaber, and in U.S. Pat. No. 5,705,191 "Sustained Delivery of Active Compounds From Tubules, With Rational Control" to Price et al, the disclosures of which are incorporated herein by reference.

In other embodiments of a novel microstructure of the present invention, halloysite microtubules may be used as a distributed charge storage device. In one such embodiment, halloysite microtubules are combined with a conductive polymer such as polypyrrole. The halloysite microtubules are mixed with a liquid form of said conductive polymer. The ratio of halloysite microtubules to conductive polymer may be varied to increase or decrease the overall distributed capacitance of the charge storage device.

The mixture of halloysite microtubules and conductive polymer may be deposited as a thin film using epitaxy techniques known to one skilled in the art. Conductive polymers such as polypyrrole may be deposited in thin film layers, as disclosed in U.S. Pat. No. 5,827,186, the disclosure of which is incorporated herein by reference.

FIG. 7 is a side cross-sectional view of a distributed charge storage device comprising halloysite tubules. Referring to FIG. 7, a structure 1400 is shown comprising a substrate 1409. Deposited on the substrate 1409 is a layer of conductive polymer 1407 that contains halloysite microtubules 1405. FIG. 7 shows such a structure in an inactive state, that is, not acted upon by any external magnetic or electric field.

FIG. 8 shows a structure containing a substrate and a layer of conductive polymer with halloysite microtubules in the presence of a magnetic field 1415 at time t=0, i.e. the moment that the magnetic field 1415 is applied. When a magnetic field is placed near a conductor, a flow of surface currents (known as eddy currents) is set up in the conductor, as is known to one skilled in the art. At the onset of the application of the magnetic field 1415, electrons 1411 begin to flow along the surface of the conductive polymer 1407. The flow of electrons 1411 establishes eddy currents 1413 in the conductive polymer 1407.

Referring now to FIG. 9, a steady state magnetic field 1417 is shown in proximity to the structure 1400. The halloysite microtubules 1405 act as capacitive structures, with the inside of the halloysite microtubule containing a dielectric, and the surrounding conductive polymer 1407 serving as conductive plates. The dielectric may, in one embodiment, be air. Other embodiments may use tantalum oxide, aluminum oxide, alumina, aluminosilicates, borosilicate, ceramic, silicon oxide, mica, polymer films, polyesters such as Mylar, Kapton, polyamides, polycarbonate, polyvinylchloride, and the like. The capacitive halloysite elements serve to retain and store the electrons 1411, essentially stopping the flow of eddy currents 1413 shown in FIG. 8.

It is to be understood that the particular orientation of the halloysite nanotubules in FIGS. 7, 8, and 9 is for illustrative purposes, and that such nanotubules may be oriented in a more random order, as depicted e.g., in FIG. 4.

The reduction or elimination of eddy currents has numerous applications in the electronics and medical imaging industries. For example, unwanted eddy currents in radio frequency communications equipment cause interference and distortion of the intended radio frequency signals. In military applications, the reduction or elimination of eddy currents will change the signature of an object being interrogated by a radar signal. In medical applications, eddy currents in magnetic resonance imaging (MRI) procedures cause image distortion and image artifacts. The reduction or elimination of eddy currents caused by a metal object during a magnetic resonance imaging procedure will greatly improve MRI image quality.

Other useful structures, both two dimensional and three dimensional, may be formed with nanotubules containing active agents. For preparation of a substantially two dimensional structure, one may prepare a high viscosity paste or ink containing such nanotubules, and directly write a two dimensional structure on a substrate. One suitable direct writing instrument is the Micropen®, sold by the Ohmcraft Corporation of Honeoye Falls, N.Y. Such an instrument is described in U.S. Pat. No. 4,485,387, "Inking system for producing circuit patterns," of Drumheller, the disclosure of which is incorporated herein by reference. This direct writing instrument has the additional capability to write lines of material on a generally planar surface having some topographical features. The direct writing process is typically followed by drying/curing in a linear belt furnace with multiple temperature gradient zones to remove the solvents and fuse the metal or resistive particles to the substrate, where such curing is required. In another embodiment, an ink or paste containing microtubules may also be deposited on a substrate using thick film screen printing deposition and furnace processing techniques known to one skilled in the art.

Three dimensional structures may also be formed by the deposition of patterned two dimensional layers formed sequentially by the direct writing instrument. See, for example, "Fabricated Microvascular Networks," S. White et al., *AFRL Technology Horizons*, April 2004, at http://www.afrlhorizons.com/Briefs/Apr04/OSR0305.html. In this publication, there is disclosed a technique for fabricating three-dimensional microvascular networks, including a microvascular network made by fabricating a scaffold using a robotic deposition apparatus and a fugitive organic ink. In one embodiment after such scaffold structure was created, it was surrounded with an epoxy resin that was cured. After curing, the resin was heated to liquefy and extract the ink, leaving behind a network of interlocking tubes and channels. Subsequently, the open network was filled with a photocurable resin and selectively masked and polymerized with ultraviolet light to plug selected channels. Finally, the uncured resin was drained, leaving the desired pathways in the completed network.

There is further disclosed square spiral mixing towers within such microvascular networks, and embodiments including self-healing materials comprised of microcapsules of healing agents. In particular, it is disclosed that, "Where damage occurs locally, the capsules break open and repair the material. With repeated damage in the same location, however, the supply of healing agent may become exhausted. By using capillaries to carry the healing agent, the performance of self-healing materials could improve. By incorporating a microvascular network within the material, [one can] continuously transport an unlimited supply of healing agent, significantly extending the lifetime of the material."

In such an embodiment, the reliance upon microcapsules that rupture is disadvantaged in that such rupturing is not a well controlled process. Although such a process may be sufficient to provide self-healing of a material, it is not sufficient for circumstances wherein release of a material must be done in a relatively continuous manner. In embodiments of the present invention, such microvascular networks are provided with halloysite nanotubules containing an active agent that is released in a controlled manner, and with such control being provided as an inherent capability built into the network.

Figure 10:
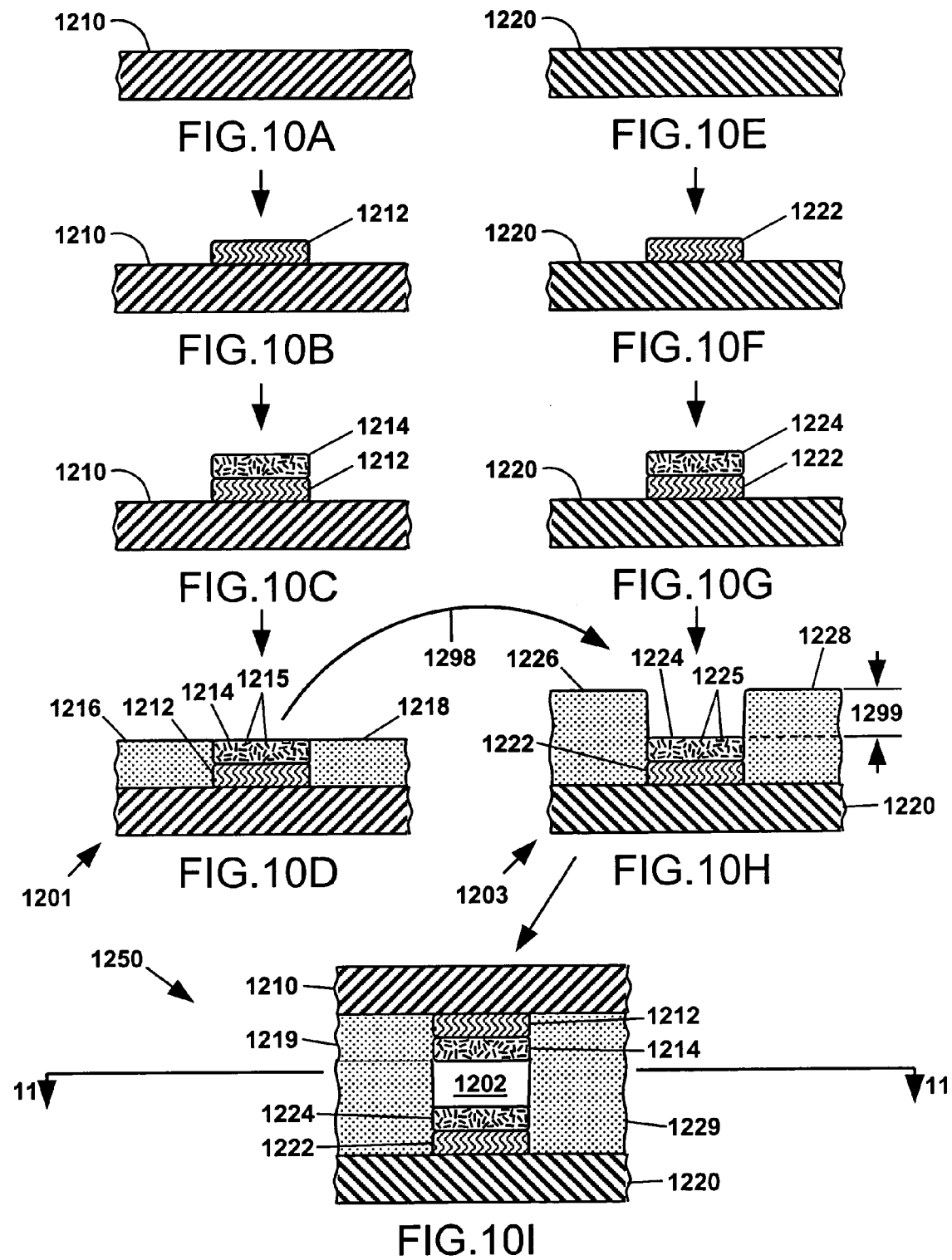
FIG. 10A-FIG. 10I are schematic illustrations of a sequence of steps in one process of fabricating a direct written or printed microchannel that is bounded by at least one wall comprised of nanotubules.

FIG. 10A-FIG. 10I are schematic illustrations of a sequence of steps in one process of fabricating a direct written or printed microchannel that is bounded by at least one wall comprised of nanotubules. Referring to FIG. 10A, a suitable substrate 1210 is provided upon which the microchannel is to be fabricated. Substrate 1210 may be of metal, polymer, ceramic, or a composite material. In the preferred embodiment, substrate 1210 is electrically insulating and thermally insulating. Alternatively, substrate 1210 may be electrically conducting, with an insulative film (not shown) coated thereupon over the entire surface, or in specified regions as required for the insulation of electrically charged and/or heated parts of the microchannel structure.

Referring to FIG. 10B, a strip of a first material 1212 is written by a direct writing instrument as previously described herein, or otherwise deposited on substrate 1210. In one embodiment, material 1212 may simply function as an adhesive to improve the adhesion of a subsequent layer of material containing nanotubules. In one preferred embodiment, material 1212 is a paste material that forms a resistive heating element after such material is cured, when a voltage is applied to such cured material. Such materials are well known and are used to fabricate thick film heater elements. See, for example, the publication, "PML Ohmcraft Aug. 13, 2004" by the Ohmcraft Corporation, available at http://www.ohmcraft.com/PDFs/ThickFilmSteelFactSheet.pdf. Following the deposition of material 1212, such material is cured to form a resistive heating element.

Referring to FIG. 10C, a strip of a second material 1214 is written by a direct writing instrument as previously described herein, or otherwise deposited on strip of first material 1212. Second material 1214 is a viscous paste containing nanotubules 1215 dispersed in a binder material such as a polymer. In the preferred embodiment, nanotubules 1215 are halloysite nanotubules, and are filled with an active agent as described herein, and as described in the aforementioned various patents of Price et al., incorporated herein by reference. In one alternative embodiment, the strip of second material 1214 comprising nanotubules 1215 is deposited directly on substrate 1210; although it is preferable to deposit the strip of second material 1214 onto the first material 1212 that forms a resistive heater, for reasons that will be explained subsequently.

Referring to FIG. 10D, strips 1216 and 1218 of an insulative and adhesive filler material such as e.g., parylene, are coated adjacent to layered strip of material 1212/1214, to a depth approximately equal to the depth of layered strip of material 1212/1214 to form the upper portion 1201 of the microchannel.

Referring to FIGS. 10E-10G, substrate 1220 is coated with resistive heater strip 1222 and nanotubule containing strip 1224 as described herein for FIGS. 10A-10C. Subsequently, as shown in FIG. 10H, strips 1226 and 1228 of an insulative and adhesive filler material are coated adjacent to layered strip of material 1222/1224, to a depth greater than the depth of layered strip of material 1222/1224, as indicated by gap 1299 between the surface of the strip of nanotubule-containing material 1225 and the upper surface of strip 1228. In one preferred embodiment, the nanotubules of material 1225 contain an active agent that is different from the active agent in the nanotubules of material 1215. The lower portion 1203 of the microchannel is thus formed.

After the fabrication of lower portion 1203 and upper portion 1201 are completed, as indicated in FIGS. 10A-10D and FIGS. 10E-10H, respectively, upper portion 1201 is inverted and placed upon lower portion 1203 to form microchannel structure 1250 comprised of microchannel 1202 formed between nanotubule-containing strips 1214 and 1229. In one embodiment, structure 1250 is heated such that strip 1216 of upper portion 1201 and strip 1228 of lower portion 1203 are fused into strip 1229; and strip 1286 of upper portion 1201 and strip 1226 of lower portion 1203 are fused into strip 1219. In another embodiment, the strips of the upper portion are reactive with the strips of the lower portion such that they react and bond upon contact therebetween. In another embodiment, strips 1216, 1218, 1226, and 1228 are a photoresist material, and substrates 1210 and/or 1220 are a suitably light transparent material, such that strips 1216, 1218, 1226, and 1228 are cured with ultraviolet light. In a further embodiment (not shown), upper portion 1201 and/or lower portion 1203 are provided with microcolumns of rigid supportive material at a height equal to the separation distance between substrate 1210 and substrate 1220 of microchannel structure 1250, in order to maintain such separation distance, thereby maintaining microchannel 1202 in an open state. Such microcolumns of rigid supportive material may be provided as a part of either or both substrates 1210 and 1220, or such microcolumns may intermittently deposited as dots by the direct writing instrument.

Referring to FIG. 10I, in microchannel structure 1250, the nanotubules of lower strip 1224 preferably contain a first active agent that is different than a second active agent contained in the nanotubules of upper strip 1214. Such first and second active agents may be reactive with each other, or such first and second agents may have a beneficial effect individually in sequence or together at some point downstream in microchannel 1202.

It is well known that the rate of diffusion of a first substance in a second substance is highly dependent upon the temperature of such substances. Thus, in operation of the microchannel structure 1250, the diffusion of active agent from the nanotubules in strip 1224 and subsequently the diffusion from the binder material in strip 1224 into microchannel 1202 can be accelerated by applying a voltage to heater strip 1222 and causing its temperature to increase, thereby increasing the temperature of nanotubule containing strip 1224.

In one embodiment, the nanotubules are filled with an active agent and a polymer carrier, as is disclosed in the aforementioned U.S. Pat. No. 5,705,191, "Sustained delivery of active compounds from tubules, with rational control," of Price et al, and in U.S. Pat. No. 5,492,696, "Controlled release microstructures," of Price et al., the disclosure of which is incorporated herein by reference. In the '696 patent of Price et al. in particular, there is disclosed at column 9 an extensive list of suitable monomer and low molecular weight polymer carrier. When such heating results in a rise in temperature beyond the glass transition temperature of such carrier and/or the binder of strip 1224, the rate of transfer of active agent from the nanotubules of strip 1224 into microchannel 1202 may be highly regulated by the operation of heater strip 1222. In like manner, the rate of transfer of active agent from the nanotubules of upper strip 1214 into microchannel 1202 may be highly regulated by the operation of heater strip 1212.

In another embodiment, the nanotubules are filled with an active agent optionally disposed in a polymer carrier, and such nanotubules are provided with endcaps as is also disclosed in U.S. Pat. No. 5,705,191 at column 5, "Providing Tubules With Degradable Endcaps." If such endcaps are thermally degradable, such as lipid or polymer endcaps, when such heating results in a rise in temperature beyond the glass transition temperature of such endcaps, or otherwise thermally degrades such endcaps, the rate of transfer of active agent from the nanotubules of strip 1224 into microchannel 1202 may be highly regulated by the operation of heater strip 1222.

In circumstances wherein the active agents in the nanotubules of strip 1224 are reactive with the nanotubules of strip 1214, heater strips 1222 and 1212 are operated simultaneously. In circumstances wherein it is desired to release into microchannel 1202 a first active agent, e.g. an active agent from the nanotubules of strip 1224, followed by the release into microchannel 1202 a second active agent from the nanotubules of strip 1214, heater strip 1222 may be energized first, followed by heater strip 1212 being energized.

The process described herein and shown in FIGS. 10A-10H to make the microchannel structure 1250 of FIG. 10I is one way to fabricate such microchannel structure, but is not intended to be limited as the only way to make such structure. In another embodiment, such a structure may be fabricated according to the methods disclosed in the aforementioned publication "Fabricated Microvascular Networks," of S. White et al. Other microfabrication methods used such as e.g., those used in the fabrication of microelectromechanical (MEMS) devices will also be apparent to those skilled in the art.

Figure 11:
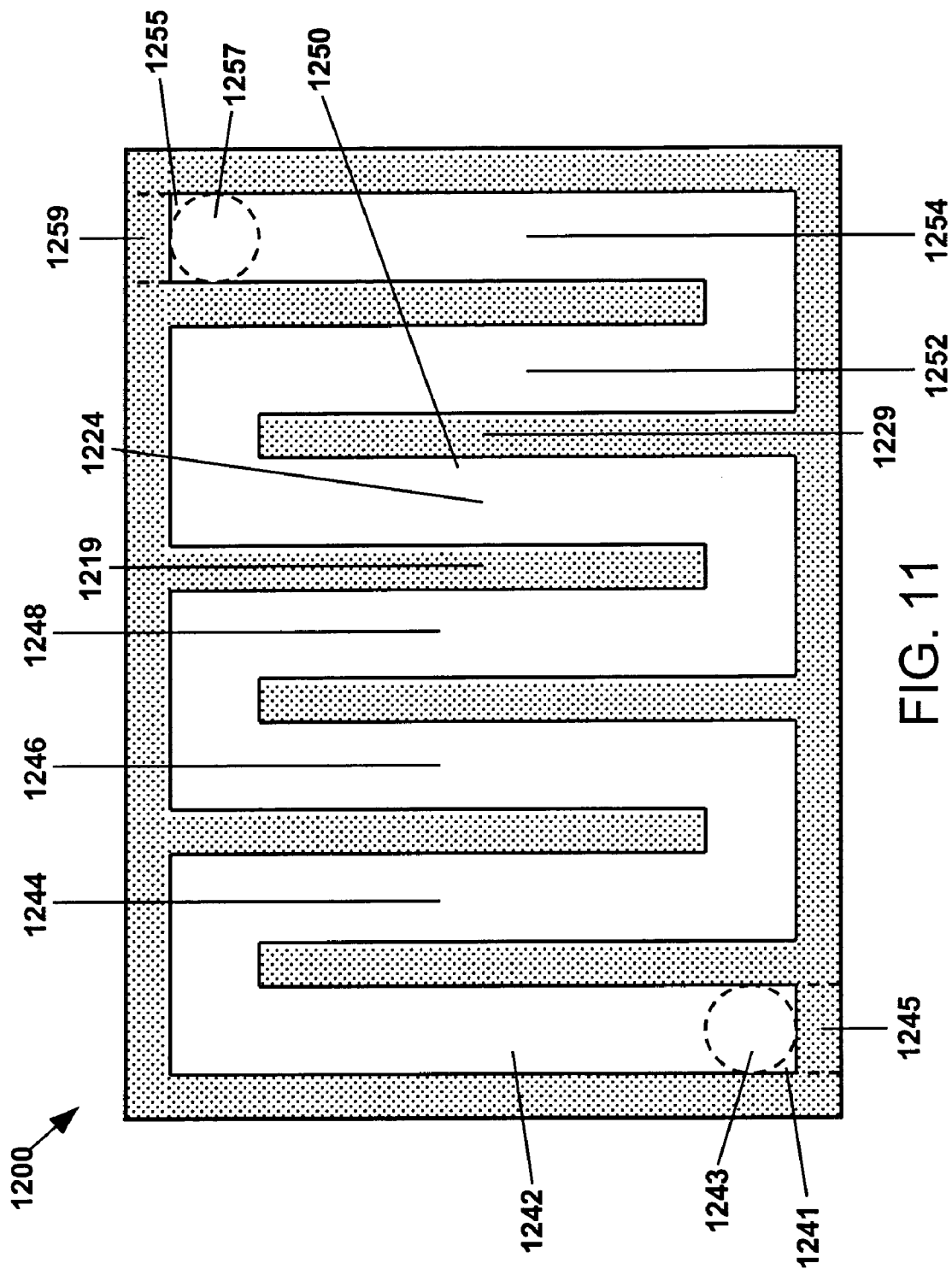
FIG. 11 is a plan view of a microchannel formed on a substrate by the process of FIGS. 10A-10I.

Large arrays of such microchannel structures 1250 as shown in FIG. 10I may be integrated, both in two dimensions and three dimensions, in complex microvascular networks containing multiple channels in which a plurality of reagents is delivered into the microchannels therein, thereby providing a "chemical reactor on a chip" integrated device. FIG. 11 is a plan view of one example of a two dimensional complex microchannel formed on a substrate by the process of FIG. 10A-10I. Referring to FIG. 10I and FIG. 11, it can be seen that the microchannel structure 1250 of FIG. 10I is integrated into channel network 1200. In FIG. 11, microchannel structure 1250 is viewed along line 11-11 of FIG. 10I; hence the portion of microchannel structure 1250 depicted in FIG. 11 consists of insulative/adhesive strips 1219 and 1229, and nanotubule-containing strip 1224, which forms the bottom surface of microchannel 1202 (see FIG. 10I).

Channel network 1200 further comprises microchannels 1242, 1244, 1246, 1248, 1252, and 1254, all of which are joined together by 180 degree "elbows" to form a unitary continuous channel beginning at entry 1241 and terminating at exit 1255. The fluid connection to entry 1241 may be either through an upward or downward port 1243 that connects to an additional network (not shown) above or below channel network 1200, or the fluid connection may be laterally through port 1245. In like manner, the fluid connection to exit 1255 may be either through an upward or downward port 1257 that connects to an additional network (not shown) above or below channel network 1200, or the fluid connection may be laterally through port 1259.

The serpentine channel network 1200 depicted in FIG. 11 is meant to be illustrative of one type of channel structure. It will be apparent that many other complex microchannel network structures are possible and may comprise various tees, Y's, crosses, and other branched structures, formed with angles other than the orthogonal and parallel channels depicted in FIG. 11. Such complex structures, comprised of individual microchannels containing nanotubules filled with a variety of active agents, with release into each microchannel being controlled by a dedicated heating strip formed therein, are thus capable of operating as miniature chemical reactors, implantable drug delivery devices and the like in extremely small spaces.

Other three dimensional structures may also be formed by the use of rapid prototyping methods and apparatus that are used for the production of prototype articles directly from three dimensional computer aided design files such as those rendered in SolidWorks® or in Pro/Engineer®. One may use a rapid prototyping machine sold by the Stratasys Corporation of Eden Prairie, Minn. Such rapid prototype machines are described in U.S. Pat. No. 6,790,403, "Soluble material and process for three-dimensional modeling," of Priedeman, Jr. et al.; U.S. Pat. No. 6,749,414, "Extrusion apparatus for three-dimensional modeling," of Hanson et al.; U.S. Pat. No. 6,578,596, "Apparatus and method for thermoplastic extrusion," of Batchtelder et al.; U.S. Pat. No. 6,067,480, "Water soluble rapid prototyping support and mold material," of Lombardi et al.; United States published application 2004/0222561, "Soluble material and process for three-dimensional modeling," of Priedeman, Jr. et al., the disclosures of which are incorporated herein by reference.

In U.S. Pat. No. 6,749,414 in particular, there is disclosed a multi-tip extrusion apparatus and design methodology whereby a single extrusion head having approximately coplanar, fixed-position dispensing tips is used in a three-dimensional modeling machine to deposit multiple types of materials from distinct material supply sources. In one preferred embodiment of the present invention, such an apparatus is charged with a first polymer material, and a second polymer material containing halloysite tubules filled with an active agent. The apparatus is programmed to fabricate a three dimensional part in which the second polymer material containing halloysite tubules filled with an active agent is only dispensed at certain predetermined locations within the part.

In this manner, a variety of useful devices can be fabricated wherein an active agent is incorporated therein at certain locations for subsequent controlled release. For example, in one embodiment, one may form a prosthesis in which a drug is contained in only a specific location, for a controlled and targeted delivery in the body in which such prosthesis is implanted.

Nanocomposites Comprised Of Halloysite Nanotubules

In one embodiment, the halloysite nanotubules are used as a structural component in a composite material. Such a composite material may comprise a polymer, a polymer blend, or a copolymer into which the nanotubules are dispersed and blended.

Composites containing micron or nanometer scale particles, rods, needles, or tubules are well known. In recent years, polymer composites comprised of clay nanoparticles in particular have been prepared and made into or incorporated in products. Reference may be had to U.S. Pat. No. 6,767,952, "Article utilizing block copolymer intercalated clay," of Dontula et al., the disclosure of which is incorporated herein by reference. In this patent, there is disclosed an intercalated clay comprising a clay intercalated with a block copolymer wherein said block copolymer comprises a hydrophilic block capable of intercalating said clay. An additional embodiment is an article comprising a matrix polymer and clay wherein said clay is intercalated with a block copolymer, wherein said block copolymer comprises a hydrophilic block capable of intercalating said clay and a matrix compatible block compatible with said matrix polymer. At column 6 of the '952 patent of Dontula et al., it is disclosed that, "The clay material suitable for this invention can comprise any inorganic phase desirably comprising layered materials in the shape of plates with significantly high aspect ratio. However, other shapes with high aspect ratio will also be advantageous, as per the invention. . . . Preferred clays for the present invention include smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites."

Unique and superior properties are attained with nanocomposites comprising inorganic nanoparticles. At column 1 of the '952 patent of Dontula et al., it is further disclosed that, "These properties include improved mechanical properties, such as elastic modulus and tensile strength, thermal properties such as coefficient of linear thermal expansion and heat distortion temperature, barrier properties, such as oxygen and water vapor transmission rate, flammability resistance, ablation performance, solvent uptake, etc. Some of the related prior art is illustrated in U.S. Pat. Nos. 4,739,007; 4,810,734; 4,894,411; 5,102,948; 5,164,440; 5,16,460 5,248,720; 5,854, 326; and 6,034,163.

"In general, the physical property enhancements for these nanocomposites are achieved with less than 20 vol. % addition, and usually less than 10 vol. % addition of the inorganic phase, which is typically clay or organically modified clay. Although these enhancements appear to be a general phenomenon related to the nanoscale dispersion of the inorganic phase, the degree of property enhancement is not universal for all polymers. It has been postulated that the property enhancement is very much dependent on the morphology and degree of dispersion of the inorganic phase in the polymeric matrix.

The clays in the polymer-clay nanocomposites are ideally thought to have three structures (1) clay tactoids wherein the clay particles are in face-to-face aggregation with no organics inserted within the clay lattice, (2) intercalated clay wherein the clay lattice has been expanded to a thermodynamically defined equilibrium spacing due to the insertion of individual polymer chains, yet maintaining a long range order in the lattice; and (3) exfoliated clay wherein singular clay platelets are randomly suspended in the polymer, resulting from extensive penetration of the polymer into the clay lattice and its subsequent delamination. The greatest property enhancements of the polymer-clay nanocomposites are expected with the latter two structures mentioned herein above."

Reference may be had also to United States published application 2002/0161101, "Halogen containing-polymer nanocomposite compositions, methods, and products employing such compositions," of Carroll et al., the disclosure of which is incorporated herein by reference. In this published application, Carroll et al. disclose combinations of various organic and inorganic nanomaterials combined with halogen-containing monomers or polymers. With regard to polymer-clay nanocomposites in particular, there is disclosed on page 3 in paragraphs [0038]-[0046] the following:

"Further, in regards to inorganic/polymer nanocomposites there are at least two types of inorganic layered silicate/polymer nanocomposites, i.e. intercalates and exfoliates, depending upon the organization of the silicate layers. Intercalates are obtained when polymer is located between the silicate layers and while the layer spacing is increased. There are attractive forces between the silicate layers which cause the layers to be provided in regularly spaced stacks. Exfoliates are obtained when the layer spacing increases to the point at which there no longer is sufficient attraction between the silicate layers to cause a uniform layer spacing. In exfoliates, silicate layers are randomly dispersed throughout the composite.

"Organosilicates may be more compatible with engineering plastics, as they usually contain various functional groups that interact and/or react with the polymer to improve adhesion between the inorganic phase and the matrix. Various methods of synthesis may be employed:

"(1) Nanomaterials can be solution mixed with dissolved pre-formed polymer.

(2) Nanomaterials can be melt mixed with molten pre-formed polymer.

(3) Nanomaterials can be solution mixed with insitu solution polymerization of the host polymer.

(4) Nanomaterials can be melt mixed with insitu melt polymerization of host polymer.

(5) Nanomaterials can be mixed via multi-phase processes involving both pre-formed polymer and/or insitu polymerization such as, aqueous dispersion or emulsion polymerization with or without the addition of surfactants.

(6) Nanomaterials can be mixed with pre-formed polymers or by insitu polymerization as described in 1-5 above with or without the aid of heat and sonication.

(7) Nanomaterials can be mixed with sol-gel precursors such as tetraalkoxysilanes (e.g., TEOS or TMOS) or otherwise organic functional trialkoxysilanes and polymerized by catalytic hydrolysis to a silicate or silicate/organic hybrid nanocomposite."

At page 7, paragraphs [0084] and [0085] of United States published application 2002/0161101, it is further disclosed with regard to "Halo-Polymer Compositions With Clay Materials," that, "Nanocomposite matrix compositions may be developed using halogen-containing monomers or polymers or co-polymers as described above in connection with the Examples (or other halogen-containing monomers or polymers as disclosed in this specification) as combined with various clay materials. For example, it is possible to provide in the matrix set forth in the examples above to include a clay product, such as a hydrated aluminum silicate (as one example).

Naturally occurring clays may be used, including but not limited to kaolinite, bentonite, mica, talc, silica nanoparticles, montmorillonite, attapulgite, illite, bentonite, halloysite, fullers earth, kaolin, and polyorganosilicate graft polymers.'

Further disclosures of polymer-clay nanocomposites, methods of preparation thereof, and articles made therefrom may be found in United States published application 2004/00593037, "Materials and method for making splayed layered materials," of Wang et al.; U.S. Pat. No. 6,767,952, "Polyester nanocomposites," of Nair et al.; United States published application 2003/0203989, "Article utilizing highly branched polymers to splay layered materials," of Rao et al.; United States published application 2003/0191224, "Organically modified layered clay as well as organic polymer composition and tire inner liner containing same," of Maruyama et al.; United States published application 2004/0233526, "Optical element with nanoparticles," of Kaminsky et al.; United States published application 2004/0259999, "Polyester/clay nanocomposite and preparation method," of Kim et al.; U.S. Pat. No. 6,832,037, "Waveguide and method for making same," of Aylward et al.; United States published application 2004/0067033, "Waveguide with nanoparticle induced refractive index gradient," of Aylward et al.; U.S. Pat. No. 6,728,456, "Waveguide with nanoparticle induced refractive index gradient," of Aylward et al.; United States published application 2004/0242752, "Hydrophilized porous film and process for producing the same," of Fujioka et al.; U.S. Pat. No. 6,770,697, "High melt-strength polyolefin composites and methods for making and using same," of Drewniak et al.; U.S. Pat. No. 6,811,599, "Biodegradable thermoplastic material," of Fischer et al.; United States published application 2004/0068038, "Exfoliated polystyrene-clay nanocomposite comprising star-shaped polymer," of Robello et al.; U.S. Pat. No. 6,710,111, "Polymer nanocomposites and the process of preparing the same," of Kuo et al.; U.S. Pat. No. 6,060,549, "Rubber toughened thermoplastic resin nano composites," of Li et al.; U.S. Pat. No. 5,972,448, "Nanocomposite polymer container," of Frisk et al.; United States published application 2002/0132875, "Solid nanocomposites and their use in dental applications," of Stadtmueller; United States published application 2002/0110686, "Fibers including a nanocomposite material," of Dugan; U.S. Pat. No. 6,117,541, "Polyolefin material integrated with nanophase particles," of Frisk; U.S. Pat. No. 6,117,541, "Transparent high barrier multilayer structure," of Frisk; U.S. Pat. No. 6,265,038, "Transfer/transfuse member having increased durability," of Ahuja et al.; U.S. Pat. No. 6,190,775, "Enhanced dielectric strength mica tapes," of Smith et al. The disclosures of these United States patents and published applications in their entirety are incorporated herein by reference.

In the formulation of the nanocomposite materials of the present invention, nanotubules of halloysite clay are provided alternatively or additionally to the clay constituents of prior art nanocomposites. In such nanocomposite materials of the present invention, there is provided superior and improved mechanical properties as described in e.g., the '952 patent of Dontula et al. In addition, in certain embodiments, when such nanotubules are loaded with certain active agents and incorporated into the composite, these properties may be tuned by triggering or accelerating the release of such active agent into the polymer matrix of the composite.

In the present invention, the halloysite nanotubules are preferably between about 40 nanometers and about 200 nanometers in outer diameter, about 20 nanometers and 100 nanometers in inside diameter, and about 100 to about 2000 nanometers in length. The aspect ratio (length/diameter) is preferably about 3 to about 10. The preferred dimensional ranges and aspect ratio for the nanotubules may vary depending upon the particular application for the composite material.

In preparation of a polymer-halloysite nanotube composite (hereinafter abbreviated PHNT composite) comprised of halloysite nanotubules, the nanotubules are mixed with and blended into the polymer when such polymer is in a liquid state as a hot melt, or is dissolved in a suitable solvent. Alternatively, such polymer may be in an unpolymerized state, i.e. as an unreacted monomer or a partially polymerized resin. In another embodiment, the tubules may be mixed in with one component of a two component reactive system, such as an epoxy resin that is mixed and subsequently polymerized by the use of an "activator" or "hardener." Both thermoset and thermoplastic polymers may be used in PHNT composites, including but not limited to nylons, polyolefins (e.g. polypropylene), polystyrene, ethylene-vinyl acetate copolymer, epoxies, polyurethanes, polyvinylidene fluoride, polyimides and poly(ethylene terephthalate) (PET).

The nanotubules may be provided as a powder, or as a liquid dispersion or slurry, with such liquid being mixed in with the liquid polymer, monomer resin, or polymer component by conventional means such as batch mixing by an impeller, or other rotational mixing agitator, in a vessel. In one embodiment, the halloysite nanotubules may be mixed in using a twin screw componder as described at columns 12 and 13 of U.S. Pat. No. 6,767,952 of Dontula et al. Alternatively, the nanotubules may be provided as a dispersion or slurry, wherein a liquid stream of such dispersion flowing in a first tube or conduit is joined with a flowing liquid stream of liquid polymer, monomer resin, or polymer component in a second tube or conduit, and such combined streams in a third tube or conduit are immediately delivered through a motionless mixer, in order to thoroughly mix the nanotubules with the liquid polymer, monomer resin, or polymer component into a nanotube-containing liquid.

Subsequently, the nanotube-containing liquid is processed to make an intermediate PHNT product, or an end PHNT product. Intermediate products include films, sheets, rods, bars, and other elongated structural shapes that can be subsequently machined, molded, pressed, or otherwise formed into other shapes for use as or within a product. Many end products may be made from the halloysite nanotubule composites of the present invention, including but not limited to food packaging, dental implants, optical waveguides, woven fiber products, imaging films, tapes, and rubber goods.

The particular process used to make such intermediate products will depend upon the form of the intermediate product. Thin films of PHNT composite may be formed from the nanotube-containing liquid on a suitable substrate by conventional thin-film forming methods including but not limited to spray coating, dip coating, and roll coating. The latter method, roll coating, pertains to the coating of thin liquid films upon rolls of sheet substrate such as e.g., acetate polymer substrate used in photographic film, or metallized poly(ethylene terephthalate) substrate used in organic photoconductors. Film formation methods for roll coating include reverse roll coating, forward roll coating, gravure coating, slot die extrusion coating, and slide die coating. A complete description of these coating processes may be found in *Modern Coating and Drying Technology*, Cohen et al., John Wiley and Sons, 1990. After formation of the PHNT composite thin film, such film may remain on the substrate in such cases where the substrate is an integral functional part of the product, or provides additional structural support to the product. In other embodiments, a substrate is provided that has poor adhesion to the PHNT composite thin film, thereby enabling the PHNT film to be delaminated from the substrate, and wound into a separate roll for subsequent use.

In other embodiments, intermediate PHNT product in the form of sheets, rods, bars, and other elongated structural shapes may be made by processes such as extrusion, molding, or pultrusion (wherein a long fiber constituent such as glass fibers is also provided in the product). In extrusion processes for the manufacture of such sheets, rods, bars, and other elongated structural shapes, the nanotube-containing liquid may contain a dissolved gas and may be delivered through an extrusion die at high pressure, such that an extruded PHNT foam is produced when the nanotube-containing liquid exits the extrusion die and is at the much lower pressure of the ambient atmosphere. The PHNT product may be comprise a thermoset polymer such as an epoxy or polyester, or a thermoplastic polymer such as polypropylene. When the PHNT product comprises a thermoplastic polymer, the PHNT product may be made using a process wherein the nanotube-containing polymer liquid is provided as a hot-melt polymer liquid.

In certain embodiments, the PHNT composite materials are formed with the nanotubules oriented in selected directions, so as to provide anisotropy in certain mechanical properties. If the nanotubules are preferentially oriented along the x-axis, for example, a PHNT composite will exhibit greater tensile and compressive strength along the x-axis than along the y- and z-axes and more resistance to bending and shear stress perpendicular to the x-axis. In certain manufacturing processes, the nanotubules may be "passively" aligned at least to a significant extent by certain effects inherent in the process. For example, in a process where a film of high viscosity nanotube-containing polymer liquid is extruded as a free-standing film, or onto a substrate, the flow of such liquid is laminar, and the nanotubes will tend to align preferentially along the streamlines of such flow. When the film is dried or cured to a final state, its mechanical properties will be anisotropic due to the directional alignment of the nanotubules.

In other embodiments, the nanotubules may be provided with a coating that allows such nanotubules to be "actively" aligned. For example, such tubules may be coated with a magnetic material such as Fe, Ni, Ni—B, Ni—P, Ni—Fe—P, and CoB, as is disclosed at column 18, lines 38-41 of the aforementioned U.S. Pat. No. 5,492,696 of Price et al. During the process when the intermediate or end product is fabricated, the product is subjected to a magnetic field while still in a liquid state, thereby providing the nanotubules with an alignment with the field lines of the magnetic field. The product is subsequently dried or cured into a solid state, thereby retaining the alignment of the coated nanotubules.

Multiple layers of sheet or films of such directionally oriented PHNT composite may be laminated together, wherein the orientation of the nanotubules varies from layer to layer, thereby providing a laminated structure of high strength.

In another embodiment, the nanotubules are loaded with an active agent that can be released after the initial curing/drying and solidification of the product. The active agent is reactive with the polymer (or polymer matrix) in a manner that changes the mechanical properties of the polymer. Thus, when the active agent is released over time in a controlled matter into the solid polymer matrix, the active agent will react or otherwise interact with the polymer to result in a time dependent change in the overall PHNT composite properties. For example, in one embodiment, the nanotubules may be filled with a solvent that can soften the polymer. The nanotubules may also be provided with end caps to retard the release of such solvent during the formation of the PHNT product.

After initial curing or drying, the resulting product has a certain modulus of elasticity and stress vs. strain behavior. Subsequently, the solvent is released from the nanotubules, providing the PHNT product with a more elastic and/or plastic behavior. This effect may be temporary, in that such solvent will subsequently diffuse and evaporate from the PHNT product. In an alternative embodiment, the nanotubules are filled with a plasticizing agent that imparts a long term change in the structural properties of the polymer matrix.

In another embodiment, the nanotubules may be filled with an active agent that reacts with the polymer to render the polymer more rigid. When the active agent is released from the nanotubules, such active agent causes cross-linking of the polymer, thereby increasing the strength of such polymer, and of the PHNT product.

The controlled release of such active agents is described in detail in U.S. Pat. No. 5,705,191, "Sustained delivery of active compounds from tubules, with rational control," of Price et al., the disclosure of which is incorporated herein by reference. In this patent, Price et al. disclose a method for releasing an active agent into a use environment, by disposing such active agent within the lumen of a population of tubules, and disposing such tubules into a use environment, either directly or in some matrix such as a paint in contact with the use environment. The tubules have a preselected release profile to provide a preselected release rate curve. The preselected release profile may be achieved by controlling the length or length distribution of the tubules, or by placing degradable endcaps over some or all of the tubules in the population, by mixing the active agent with a carrier, and filling the tubules with the carrier/agent, or by combinations of these methods.

In a further embodiment, the rate at which the active agent is released is accelerated and/or further controlled by subjecting the PHNT product/material to an energy source such as ultrasonic energy. For active agents that are volatile, or have a highly volatile component, the ultrasonic energy may result in localized cavitation within or at the ends of the tubules, thereby greatly accelerating the rate of discharge of active agent.

The description of PHNT composites of the present invention has heretofore been with regard to bulk composites, i.e. composites wherein the distribution of nanotubules through the polymer matrix is substantially homogeneous. In another embodiment, such nanotubules containing an active agent are provided to form a thin outer nanocomposite layer or "skin" on the external surface of a polymer or other material. Such a skin on the external surface of a material may be formed e.g., when the material is made by an extrusion process, as described in the aforementioned U.S. Pat. No. 4,364,857, "Fibrous clay mixtures," of Santilli.

In one embodiment, a nanocomposite material comprised of halloysite nanotubules distributed through a matrix of polyvinylidene fluoride polymer. It is well known that polyvinylidene fluoride (PVDF) is a piezoelectric material. The application of a mechanical stress to a film of PVDF results in the generation of an electric potential across such film. Conversely, the application of an electric potential across a film of PVDF results in a mechanical stress in such film, and a deformation of such film. Such piezoelectric films have thus found utility in acoustic applications, sensors, and microactuators.

In United States published application 2002/0161101, there is disclosed at page 5, paragraphs [0063]-[0068] suitable "Host Material PVDF/PVDF Copolymers" for nanocomposite materials comprising inorganic clay nanoparticles. There is further disclosed at page 7, paragraphs [0084]

and [0085] "Halo-Polymer Compositions With Clay Materials," including nanocomposites comprising halloysite nanoparticles.

In one preferred embodiment of the present invention, a nanocomposite material comprising polyvinylidene fluoride polymer and halloysite nanotubules filled with an active agent to be released from the film is provided. A high frequency AC voltage is applied to such film, resulting in a high frequency oscillation and increase in temperature of such film, with a corresponding accelerated release of active agent.

It is, therefore, apparent that there has been provided, in accordance with the present invention, an ultracapacitor comprising a first electrode containing mineral microtubules, a second electrode containing mineral microtubules, an electrolyte disposed between the first electrode and the second electrode, and a separator disposed in the electrolyte to provide electrical insulation between the first electrode and the second electrode, while allowing ion flow within the electrolyte. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An ultracapacitor comprising:
   a. a first electrode includes mineral microtubules;
   b. a second electrode includes mineral microtubules, where a portion of said mineral microtubules in at least one of the first and second electrodes are inorganic mineral microtubules;
   c. an electrolyte disposed between said first electrode and said second electrode; and
   d. a separator disposed in said electrolyte to provide electrical insulation between said first electrode and said second electrode, while allowing ion flow within said electrolyte.

2. The ultracapacitor as recited in claim 1, wherein said electrodes are formed from a paste containing mineral microtubules.

3. The ultracapacitor as recited in claim 1, wherein said electrodes are comprised of a conductive polymer containing mineral microtubules.

4. The ultracapacitor as recited in claim 1, wherein said electrodes are comprised of an aerogel containing mineral microtubules.

5. The ultracapacitor as recited in claim 1, wherein said mineral microtubules are filled with a form of carbon.

6. The ultracapacitor as recited in claim 1, wherein said mineral microtubules are filled with a pseudocapacitance material.

7. The ultracapacitor as recited in claim 1, wherein said mineral microtubules are filled with a magnetoresistive material.

8. The ultracapacitor as recited in claim 1, wherein said mineral microtubules are coated with a photoconductive material.

9. The ultracapacitor as recited in claim 1, wherein said ultracapacitor further comprises a light-transmissive casing, and at least one of said first and said second electrodes comprises a photoconductive material.

10. The ultracapacitor as recited in claim 1, wherein said microtubules include halloysite microtubules.

* * * * *